(12) United States Patent
Chaturvedi et al.

(10) Patent No.: US 12,745,292 B2
(45) Date of Patent: Sep. 22, 2026

(54) METHOD AND APPARATUS FOR MANAGING MULTIPLE TRPS DURING RACH PROCEDURE IN COMMUNICATION NETWORK

(71) Applicant: Samsung Electronics Co., Ltd., Suwon-si (KR)

(72) Inventors: Abhishek Chaturvedi, Bengaluru (IN); Neha Sharma, Bengaluru (IN); Manasi Ekkundi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/832,802

(22) PCT Filed: Apr. 4, 2023

(86) PCT No.: PCT/KR2023/004526
§ 371 (c)(1),
(2) Date: Jul. 24, 2024

(87) PCT Pub. No.: WO2023/195740
PCT Pub. Date: Oct. 12, 2023

(65) Prior Publication Data

US 2025/0176036 A1 May 29, 2025

(30) Foreign Application Priority Data

Apr. 5, 2022 (IN) ............................. 202241020444
Mar. 23, 2023 (IN) ............................. 202241020444

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/1268* (2013.01); *H04W 74/04* (2013.01)

(58) Field of Classification Search
CPC ............. H04W 74/0841; H04W 24/08; H04W 72/1268; H04W 74/04
(Continued)

(56) References Cited

U.S. PATENT DOCUMENTS

2020/0187266 A1 6/2020 Lou et al.
2021/0044342 A1 2/2021 He
(Continued)

FOREIGN PATENT DOCUMENTS

WO 2021-050045 A1 3/2021
WO 2022-067227 A1 3/2022

OTHER PUBLICATIONS

International Search Report dated Jun. 12, 2023, issued in International Patent Application No. PCT/KR2023/004526.
(Continued)

*Primary Examiner* — Christopher R Crompton
(74) *Attorney, Agent, or Firm* — Jefferson IP Law, LLP

(57) ABSTRACT

The disclosure relates to a 5G or 6G communication system for supporting a higher data transmission rate. Embodiments are directed to a method for managing multiple TRPs during RACH procedure within a multi-TRP system in a communication network. The method includes detection, by a UE (100), presence of the multi-TRP system serving in at least one of downlink and uplink and determining, by the UE (100), a first TRP serving in the downlink or the uplink, for transmission of a Random Access Preamble. The method includes determining, by the UE (100), a second TRP for monitoring a reception of a RAR and receiving, by the UE (100), the RAR on third TRP and determining, by the UE (100), a fourth TRP for scheduling PUSCH transmission by
(Continued)

a UL grant of the RAR. The method also includes determining, by the UE (100), a fifth TRP for monitoring a reception of a contention resolution message and receiving, by the UE (100), the contention resolution message on a sixth TRP.

15 Claims, 24 Drawing Sheets

(51) Int. Cl.
*H04W 72/1268* (2023.01)
*H04W 74/04* (2009.01)

(58) Field of Classification Search
USPC .......................................................... 370/329
See application file for complete search history.

(56) References Cited

U.S. PATENT DOCUMENTS

2021/0076445 A1 3/2021 Tsai et al.
2021/0195650 A1 6/2021 Zhang et al.
2023/0318688 A1* 10/2023 Huang .................. H04B 7/022
370/329

OTHER PUBLICATIONS

Indian Office Action dated Feb. 2, 2024, issued in Indian Patent Application No. 202241020444.
Indian Notice of Hearing dated Mar. 19, 2026, issued in Indian Application No. 202241020444.

* cited by examiner

FIG. 9A

```
A--ASN1START
--TAG-SIB1-START

SIB1:: =        SEQUENCE{
...
TRP_List ... {TRPID#1, TRPID#2, TRP
ID#3 ....}
TRP_validity   {timer1, timer2, timer3 ....}
UE_type {type1, type2, type3 ....} or a
BITMASK
}
```

FIG. 9B

```
--ASN1START
--TAG-SIB1-START

SIB1::=        SEQUENCE{
...
UL_on_multiTRP
        ENUMERATED{true}..
DL_on_multiTRP
        ENUMERATED{true}..
...
}
```

FIG. 13
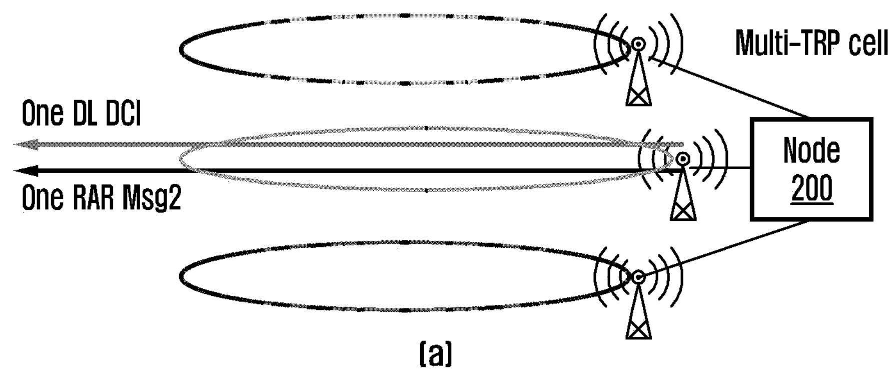
(a)
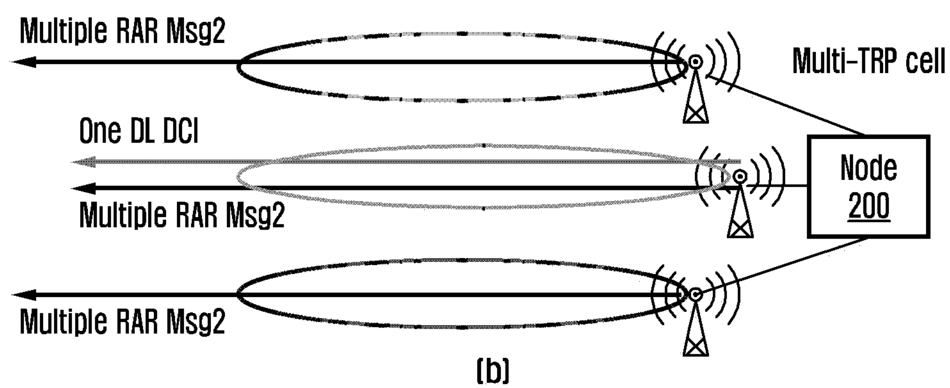
(b)
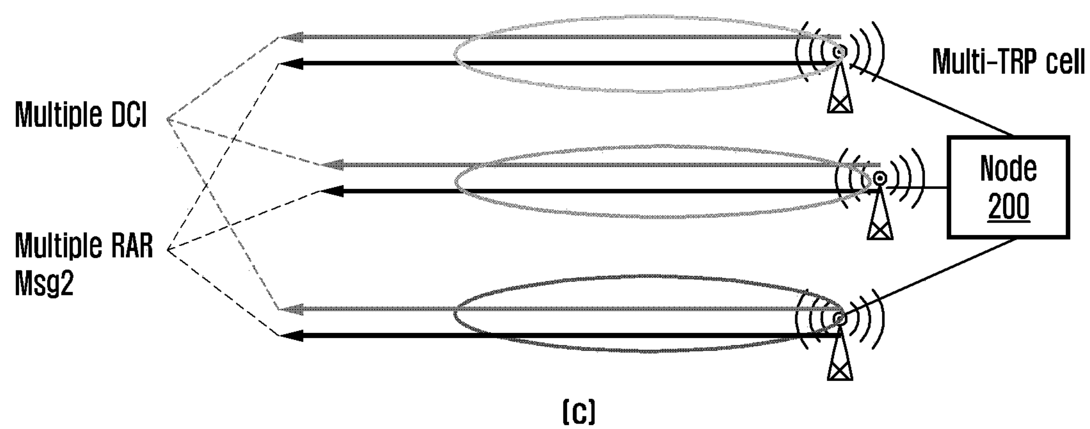
(c)

FIG. 14

NR DL DCI 1_0 for Msg2

| Field (Item) | Bits | Reference |
| --- | --- | --- |
| Frequency domain resource assignment | Variable | Variable with DL BWP N_RB $\lceil \log_2(N_{RB}^{DL,BWP}(N_{RB}^{DL,BWP}+1)/2) \rceil$ $N_{RB}^{DL,BWP}$ indicates the size of CORESET 0 |
| Time domain resource assignment | 4 | Carries the row index of thw items in pdsch allocationList in RRC |
| VRB-to PRB mapping | 1 | According to 38.212 Table 7.3.1.1.2-33<br>0 : Non-Inteleaved<br>1 : Interleaved |
| Modulation and coding scheme | 5 | 38.214 - Table 5.1.3.1-1 : MCS index table 1 for PDSCH<br>38.214 - Table 5.1.3.1-2 : MCS index table 2 for PDSCH |
| TB Scaling | 2 | |
| Reserved | 16 | Reserved |

Using first bit to indicate presence of multi TRP scheduling RAR If set to 1, then UE shall read additional TRP bitmap after Reserved bits. Additional 4/16/64 bit TRP bitmap is introduced to indicate TRPIDs on which RAR Msg2 are scheduled

| 1 | Reserved | Reserved | Reserved | Reserved | Reserved | Reserved | Reserved |
| --- | --- | --- | --- | --- | --- | --- | --- |
| Reserved | Reserved | Reserved | Reserved | Reserved | Reserved | Reserved | Reserved |

existing 16 Reserved bits

Subcript bit number = TRPID number
Bit value = 0, means no Msg2 is scheduled on this TRPID
Bit value = 1, means Msg2 is scheduled on this TRPID

| $0_1$ | $1_2$ | $0_3$ | $0_4$ | $0_5$ | $1_6$ | $1_7$ | $0_8$ |
| --- | --- | --- | --- | --- | --- | --- | --- |
| $0_9$ | $0_{10}$ | $0_{11}$ | $0_{12}$ | $0_{13}$ | $0_{14}$ | $0_{15}$ | $0_{16}$ |

beam/TRP ID set

Newly introduced bitmap

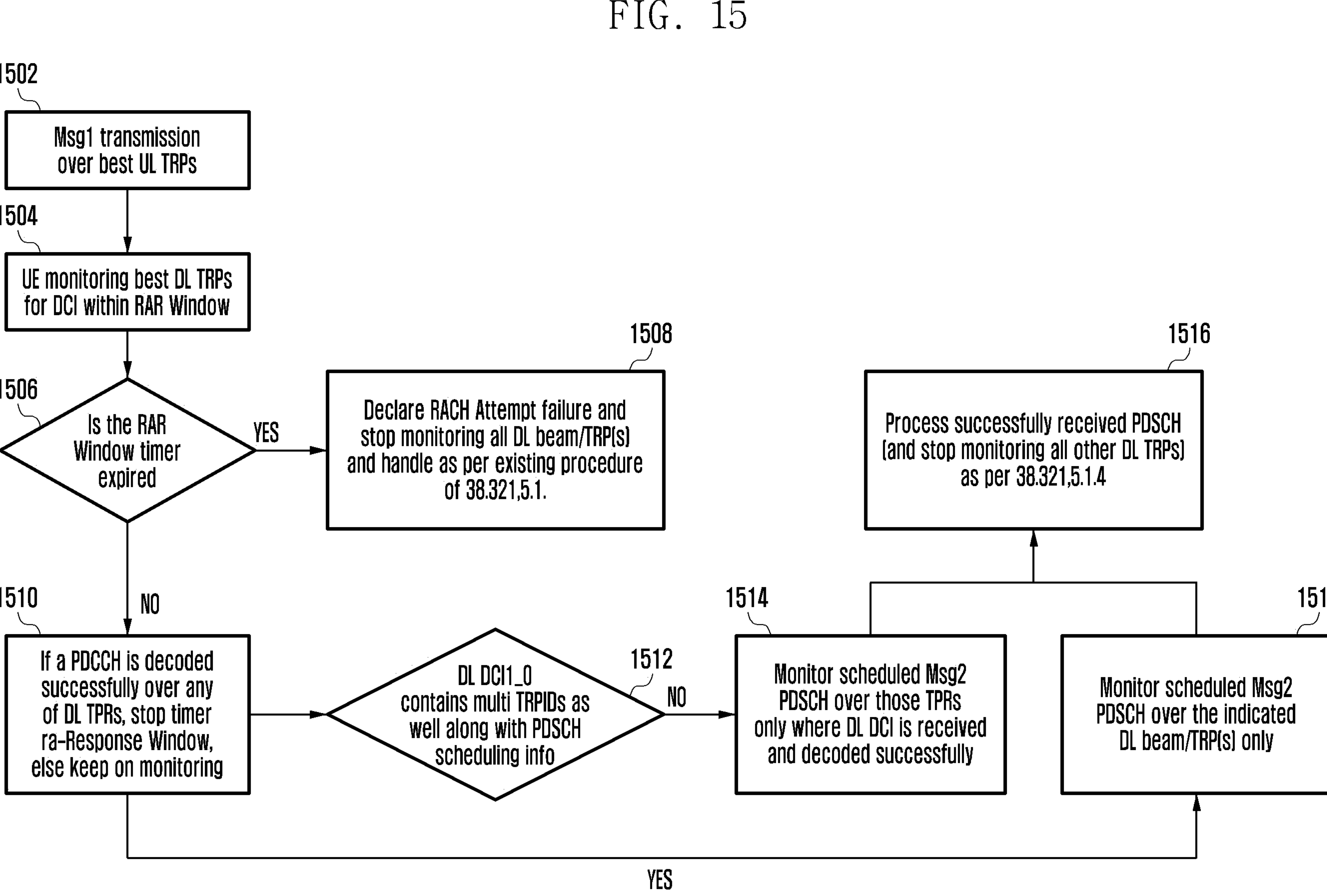

FIG. 15
1502
Msg1 transmission over best UL TRPs
1504
UE monitoring best DL TRPs for DCI within RAR Window
1506
Is the RAR Window timer expired
YES
1508
Declare RACH Attempt failure and stop monitoring all DL beam/TRP(s) and handle as per existing procedure of 38.321,5.1.
NO
1510
If a PDCCH is decoded successfully over any of DL TPRs, stop timer ra-Response Window, else keep on monitoring
1512
DL DCI1_0 contains multi TRPIDs as well along with PDSCH scheduling info
NO
1514
Monitor scheduled Msg2 PDSCH over those TPRs only where DL DCI is received and decoded successfully
1516
Process successfully received PDSCH (and stop monitoring all other DL TRPs) as per 38.321,5.1.4
1518
Monitor scheduled Msg2 PDSCH over the indicated DL beam/TRP(s) only
YES

FIG. 17

NR DL DCI 1_0 for Msg4

| Field (Item) | Bits | Reference |
|---|---|---|
| Identifier for DCI formats | 1 | Always set to 1, meaning this is for DL |
| Frequency domain resource assignment | Variable | Variable with DL BWP N_RB $\lceil \log_2(N_{RB}^{DL,BWP}(N_{RB}^{DL,BWP}+1)/2) \rceil$ $N_{RB}^{DL,BWP}$ indicates the size of CORESET 0 |
| Time domain resource assignment | 4 | Carries the row index of the items in pdsch allocationList in RRC |
| VRB-to PRB mapping | 1 | According to 38.212 Table 7.3.1.1.2-33<br>0 : Non-Inteleaved<br>1 : Interleaved |
| Modulation and coding scheme | 5 | 38.214 - Table 5.1.3.1-1 : MCS index table 1 for PDSCH<br>38.214 - Table 5.1.3.1-2 : MCS index table 2 for PDSCH |
| New data indicator | 1 | |
| Redundancy version | 2 | |
| HARQ process number | 4 | |
| Downlink assignment index | 2 | Reserved |
| TPC command for scheduled PUCCH | 2 | |
| PUCCH resource indicator | | See here, here |
| PDSCH-to-HARQ_feedback timing indicator | | Row number(index) of K1 |

Using first bit to indicate presence of multi TRP scheduling Msg4. If set to 1, then UE shall read additional TRP bitmap after Reserved bits. Additional 4/16/64 bit TRP bitmap is introduced to indicate TRPIDs on which Msg4 are scheduled.

| 1 | Reserved |
|---|---|

Subcript bit number = TRPID number
Bit value = 0, means no Msg4 is scheduled on this TRPID
Bit value = 1, means Msg4 is scheduled on this TRPID

| $0_1$ | $1_2$ | $0_3$ | $0_4$ | $0_5$ | $1_6$ | $1_7$ | $0_8$ |
|---|---|---|---|---|---|---|---|
| $0_9$ | $0_{10}$ | $0_{11}$ | $0_{12}$ | $0_{13}$ | $0_{14}$ | $0_{15}$ | $0_{16}$ |

beam/TRP ID set

METHOD AND APPARATUS FOR MANAGING MULTIPLE TRPS DURING RACH PROCEDURE IN COMMUNICATION NETWORK

CROSS-REFERENCE TO RELATED APPLICATION(S)

This application is a U.S. National Stage application under 35 U.S.C. § 371 of an International application number PCT/KR2023/004526, filed on Apr. 4, 2023, which is based on and claims priority of an Indian Provisional patent application number 202241020444, filed on Apr. 5, 2022, in the Indian Intellectual Property Office, and of an Indian Non-Provisional patent application number 202241020444, filed on Mar. 23, 2023, in the Indian Intellectual Property Office, the disclosure of each of which is incorporated by reference herein in its entirety.

TECHNICAL FIELD

The disclosure relates generally to wireless communication systems and, more specifically, the disclosure relates to managing multiple TRPs during RACH procedure in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The embodiments of the disclosure herein may provide a method and system for managing multiple TRPs during RACH procedure in communication network. The proposed method defines the RACH procedure for UEs in the multi-TRP system especially for selection of an optimal beam or an optimal TRP in the multi-TRP system, scheduling and DL transmission or UL transmission for performing the RACH procedure. As a result, the proposed method ensures seamless and continued service to the UEs by the best TRPs in the multi-TRP system.

Solution to Problem

Accordingly, embodiments herein disclose a method for managing multiple TRPs during RACH procedure within a multi-TRP system in a communication network. The method includes detection, by at least one UE of a plurality of UEs, presence of the multi-TRP system serving in at least one of downlink and uplink and determining, by the at least one UE, at least one first TRP of the plurality of TRPs serving in at least one of downlink and uplink, for transmission of a Random Access Preamble. Further, the method includes determining, by the at least one UE, at least one second TRP of the plurality of TRPs for monitoring a reception of a Random Access Response (RAR) and receiving, by the at least one UE, the RAR on at least one third TRP, wherein the at least one third TRP is determined by a node of the communication network. The method also includes determining, by the at least one UE, at least one fourth TRP of the plurality of TRPs for scheduling PUSCH transmission by a UL grant of the RAR; determining, by the at least one UE, at least one fifth TRP of the plurality of TRPs for monitoring a reception of a contention resolution message; and receiving, by the at least one UE, the contention resolution message on at least one sixth TRP, wherein the at least one sixth TRP is determined by the node of the communication network.

In an embodiment, receiving, by the at least one UE, the RAR on at least one third TRP includes determining, by the node, at least one third TRP of the plurality of TRPs for scheduling the transmission of the RAR and scheduling, by the node, the transmission of the RAR on the determined at least one third TRP. The method also includes sending, by the node, the RAR on the determined at least one third TRP based on the scheduling; and receiving, by the at least one UE, the RAR on at least one third TRP.

In an embodiment, the plurality of TRPs is detected by the at least one UE, using at least one of existing system information (SI), a new SI, a layer3 (L3) signalling broadcast message, a layer1 (L1) message or a layer2 (L2) message.

In an embodiment, determining, by the at least one UE, the at least one first TRP of the plurality of TRPs serving in the at least one of downlink and uplink, for the transmission of the Random Access Preamble includes determining, by the at least one UE, a power consumption aspect associated with the UE and determining, by the at least one UE, the transmission of the Random Access Preamble on the at least one first TRP of the plurality of TRPs based on the power consumption aspect associated with the UE. The method also includes determining, by the at least one UE, the at least one first TRP of the plurality of TRPs serving in the at least one of downlink and uplink, for the transmission of the Random Access Preamble by either the node configuring a set of identities (ID) associated with at least one first TRP of the plurality of TRPs to be used for sending the Random Access Preamble by the UE, or the at least one UE selecting the at least one first TRP of the plurality of TRPs based on a threshold criteria.

In an embodiment, the threshold criteria is one of: a minimum SSB, a minimum CSI-RS RSRP threshold criteria and a path loss evaluation for each TRP of the plurality of TRPs.

In an embodiment, the at least one second TRP for monitoring the reception of the RAR is determined by the UE by: listening on each of the plurality of TRPs serving in the DL or monitor the at least one first TRP of the plurality of TRPs.

In an embodiment, determining, by the node, the at least one third TRP of the plurality of TRPs for scheduling the transmission of the RAR includes determining, by the node, the multi-TRP system is network centric cluster and determining, by the node, the at least one third TRP of the plurality of TRPs for scheduling the transmission of the RAR as any TRP of the plurality of TRPs excluding the at least one first TRP, or more than one TRP of the plurality of TRPs that is serving the UE in the DL.

In an embodiment, determining, by the node, the at least one third TRP of the plurality of TRPs for scheduling the transmission of the RAR includes determining, by the node, the multi-TRP system is UE centric cluster; and determining, by the node, the at least one third TRP of the plurality of TRPs by associating a relative beam position of the at least one third TRP with the at least one first TRP of the plurality of TRPs over which the Random Access Preamble is received by the node.

In an embodiment, scheduling, by the node, the transmission of the RAR on the determined at least one third TRP includes either scheduling, by the node, a single RAR Msg2 on a third TRP of the plurality of TRPs, wherein the third TRP is only one serving DL TRP, or scheduling, by the node, a plurality of RAR Msg2 on the at least one third TRP, wherein the at least one third TRPs are multiple serving DL TRPs.

In an embodiment, the plurality of RAR Msg2 on the at least one third TRP is scheduled via one of: a single PDCCH or DCI; and multiple PDCCH or DCI over the plurality of TRPs.

In an embodiment, the plurality of RAR Msg2 are scheduled on the at least one third TRP by using Reserved bits in a scheduling format of a DL DCI used by the node to schedule the RAR Msg2, to indicate multiple TRP scheduling in the DL and wherein a bitmap is added at an end portion of the scheduling format of the DL DCI to provide the identities of the at least one third TRP.

In an embodiment, the at least one fourth TRP is same as the at least one first TRP of the plurality of TRPs used for transmission of the Random Access Preamble.

In an embodiment, the method further includes receiving, by the at least one UE, a Hybrid Automatic Repeat Request (HARQ) negative acknowledgment (NACK) from the node, due to channel or CRC decoding failure and determining, by the at least one UE, at least one next fourth TRP of the plurality of TRPs for scheduling the PUSCH transmission by the UL grant of the RAR, based on at least one of a priority associated with the plurality of TRPs, a validity time and a pathloss evaluation.

In an embodiment, the at least one fifth TRP of the plurality of TRPs for monitoring the reception of the contention resolution message is the at least one first TRP and the at least one next fourth TRP.

In an embodiment, receiving, by the at least one UE, the contention resolution message on the at least one sixth TRP includes determining, by the node, the at least one sixth TRP of the plurality of TRPs for scheduling the transmission of the contention resolution message and scheduling, by the node, the transmission of the contention resolution message on the determined at least one sixth TRP. Further, the method includes sending, by the node, the contention resolution message on the at least one sixth TRP based on the scheduling; and receiving, by the at least one UE, the contention resolution message on the at least one sixth TRP.

In an embodiment, scheduling, by the node, the transmission of the contention resolution message on the at least one sixth TRP includes either scheduling, by the node, a single RAR Msg4 on a sixth TRP of the plurality of TRPs, wherein the third TRP is only one serving DL TRP, or scheduling, by the node, a plurality of RAR Msg4 on the at least one sixth TRP, wherein the at least one sixth TRPs are multiple serving DL TRPs.

In an embodiment, the plurality of RAR Msg4 on the at least one sixth TRP is scheduled via one of: a single PDCCH or DCI; and multiple PDCCH or DCI over the plurality of TRPs.

In an embodiment, the plurality of RAR Msg4 are scheduled on the at least one sixth TRP by using Reserved bits in a scheduling format of a DL DCI used by the node to schedule the RAR Msg4, to indicate multiple TRP scheduling in the DL and wherein a bitmap is added at an end portion of the scheduling format of the DL DCI to provide the identities of the at least one sixth TRP.

In an embodiment, the method further includes processing, by the at least one UE, received PDSCH; and stopping, by the at least one UE, the monitoring of the plurality of TRPs.

In an embodiment, the method further includes stopping, by the at least one UE, the monitoring of the at least one second TRP and the least one fifth TRP for power optimization at the at least one UE; and monitoring, by the at least one UE, only the at least one first TRP used for the transmission of the Random Access Preamble.

Accordingly, embodiments herein disclose a user equipment (UE) for managing multiple TRPs during RACH procedure within a multi-TRP system in a communication network. The UE includes a memory, a processor, a communicator and a TRP management controller. The TRP management controller is configured to detect presence of the multi-TRP system serving in at least one of downlink and uplink determine at least one first TRP of the plurality of TRPs serving in at least one of downlink and uplink, for transmission of a Random Access Preamble and determine at least one second TRP of the plurality of TRPs for monitoring a reception of a Random Access Response (RAR). Further, the TRP management controller is also configured to receive the RAR on at least one third TRP and determine at least one fourth TRP of the plurality of TRPs for scheduling PUSCH transmission by a UL grant of the RAR. The TRP management controller is then configured to determine at least one fifth TRP of the plurality of TRPs for monitoring a reception of a contention resolution message; and receive the contention resolution message on at least one sixth TRP, wherein the at least one sixth TRP is determined by the node of the communication network.

Accordingly, embodiments herein disclose a node for managing multiple TRPs during RACH procedure within a multi-TRP system in a communication network. The node includes a memory, a processor, a communicator and a node TRP management controller. The node TRP management controller is configured to determine at least one third TRP of a plurality of TRPs for scheduling a transmission of a RAR and schedule the transmission of the RAR on the determined at least one third TRP. The node TRP management controller is configured to determine at least one sixth TRP of the plurality of TRPs for scheduling a transmission of a contention resolution message; and schedule the transmission of the contention resolution message on the determined at least one sixth TRP.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Advantageous Effects of Invention

The embodiments of the disclosure herein may provide a method and system for managing multiple TRPs during RACH procedure in communication network. The proposed method defines the RACH procedure for UEs in the multi-TRP system especially for selection of an optimal beam or an optimal TRP in the multi-TRP system, scheduling and DL transmission or UL transmission for performing the RACH procedure. As a result, the proposed method ensures seamless and continued service to the UEs by the best TRPs in the multi-TRP system.

BRIEF DESCRIPTION OF DRAWINGS

The disclosure is illustrated in the accompanying drawings, throughout which like reference letters indicate corresponding parts in the various figures. The embodiments herein will be better understood from the following description with reference to the drawings, in which:

FIG. 9A illustrates layer 3 signalling broadcast message and any other layer 1 or layer 2 message for informing the UE about the multi TRP system by the node, according to an embodiment as disclosed herein;

FIG. 9B illustrates layer 3 signalling broadcast message and any other layer 1 or layer 2 message for informing the UE about the multi TRP system by the node, according to an embodiment as disclosed herein;

FIG. 13 illustrates multiple ways to schedule RAR Msg2 in the multi TRP cellular system, according to an embodiment as disclosed herein;

FIG. 14 illustrates a scenario of making use of existing Reserved bits of NR DL DCI format 1_0 for the Msg2, according to an embodiment as disclosed herein;

FIG. 15 is a flowchart illustrating RACH Msg1 transmission, RAR Msg2 monitoring within RAR window and failure scenario handling, the Msg2 scheduling mechanism via DL DCI over one/more DL serving TRPs, Msg2 PDSCH reception and decoding, according to an embodiment as disclosed herein;

FIG. 17 illustrates a scenario of making use of existing Reserved bits of NR DL DCI format 1_0 for RAR Msg4, according to an embodiment as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1A:
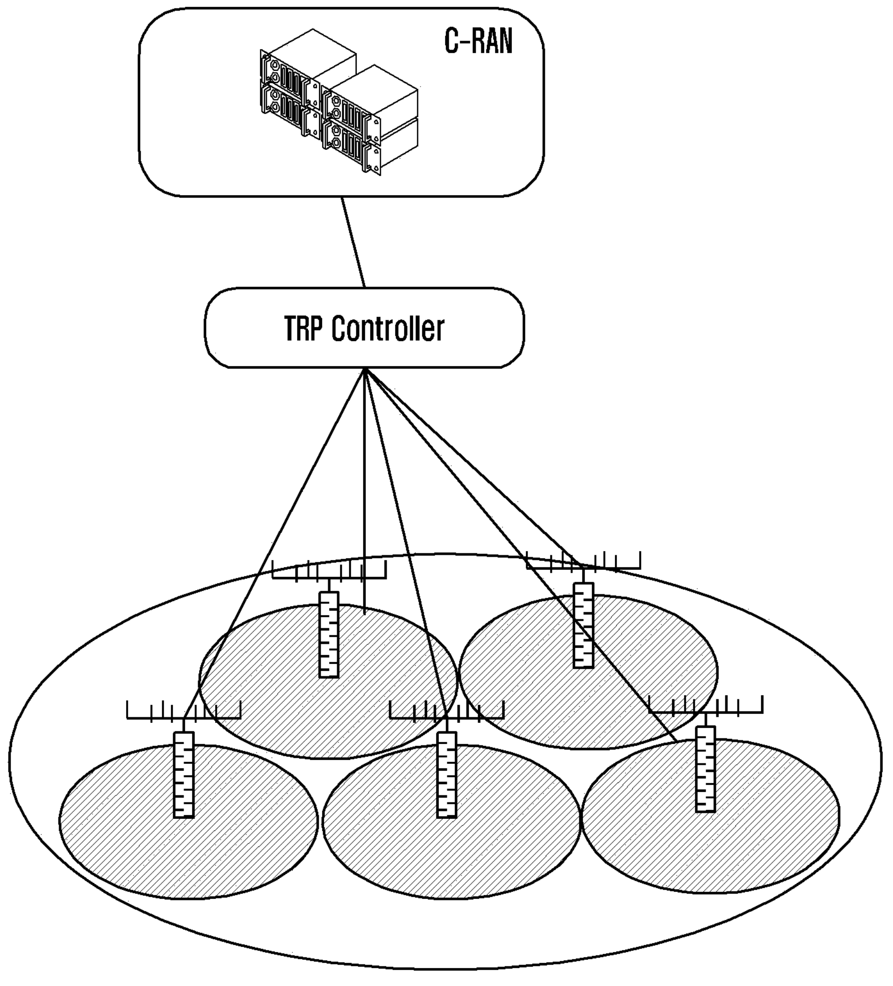
FIG. 1A illustrates an example of a cell free system with multi TRPs coordinated by TRP-C, according to the related art.
Figure 1B:
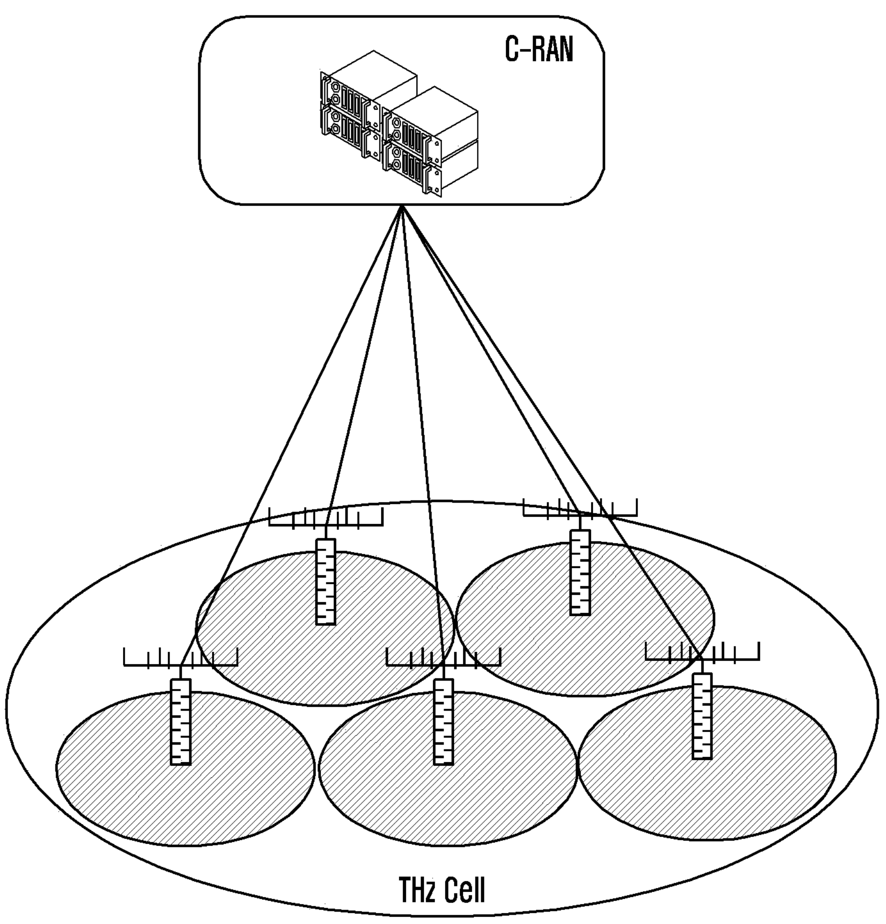
FIG. 1B illustrates an example of a cell free system with multi TRPs coordinated by C-RAN controller, according to the related art.
Figure 1C:
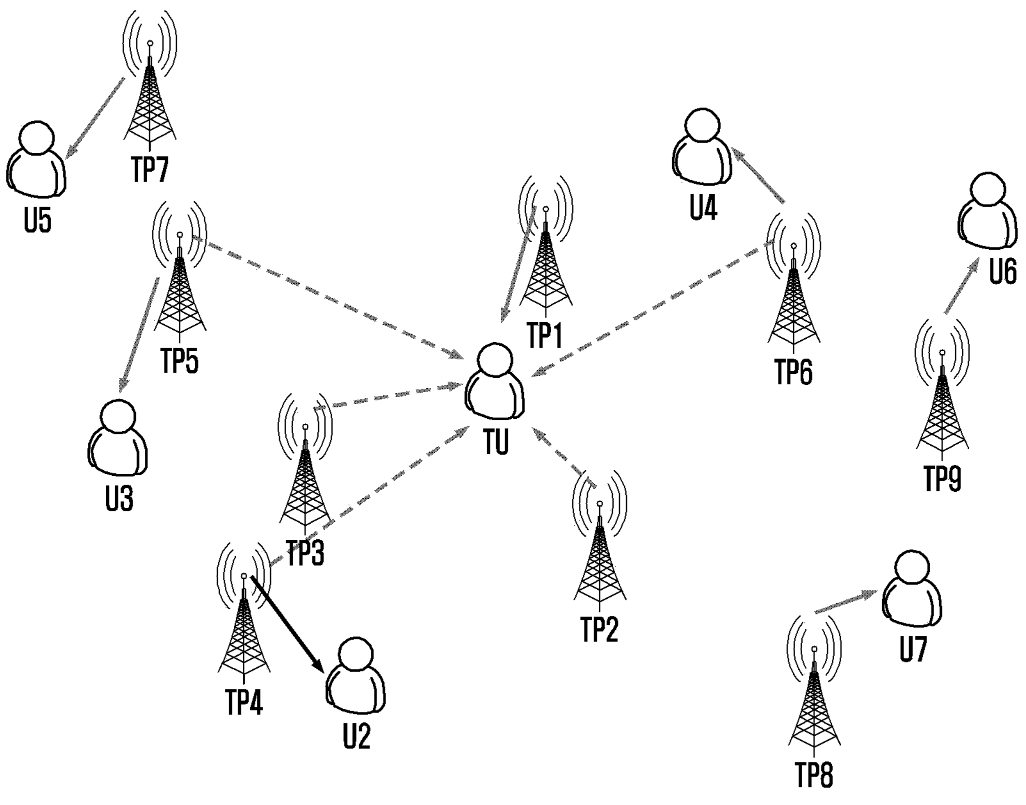
FIG. 1C illustrates an example multiple TRP system, according to the related art.

In a cell-free system such as for example a prime candidate network system for 6th generation (6G) cellular system, a cell can include multiple Transmission-Reception Points (TRPs) operating on a same carrier or same frequency of a wireless network. A TRP central or a TRP control unit such as for example a TRP-Controller (as shown in FIG. 1A) may act as a "mobility anchor" or as a "centralized control node" for the multiple TRPs in the wireless network. Also, a C-RAN controller itself (as shown in FIG. 1B) can also can act as a "mobility anchor" or as a "centralized control node" for the multiple TRPs in the wireless network. A user of the wireless network can be served through a single TRP or the multiple TRPs, where each TRP could be operating as the single beam TRP or multiple beam TRP.

Figure 2A:
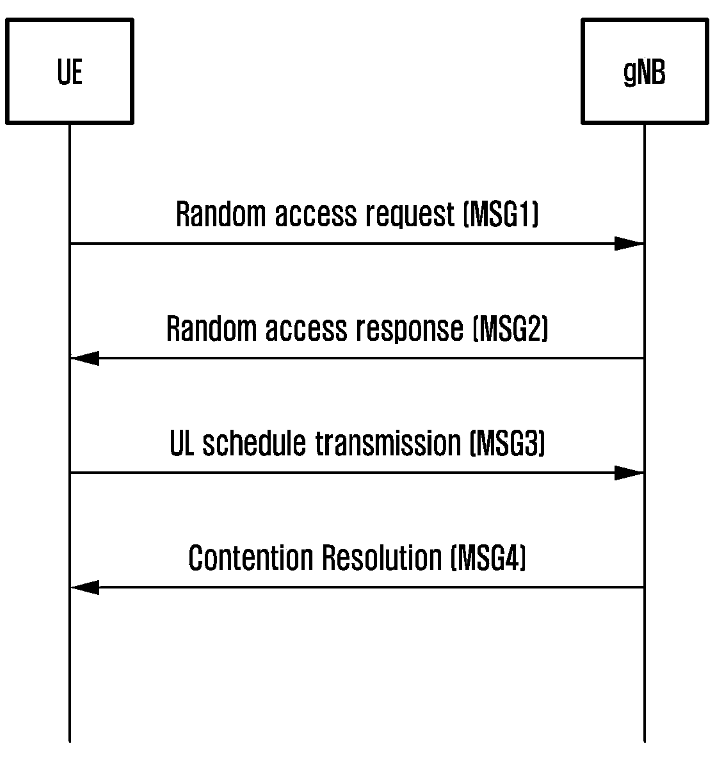
FIG. 2A is a signalling diagram of a contention-based RACH procedure, according to the related art.
Figure 2B:
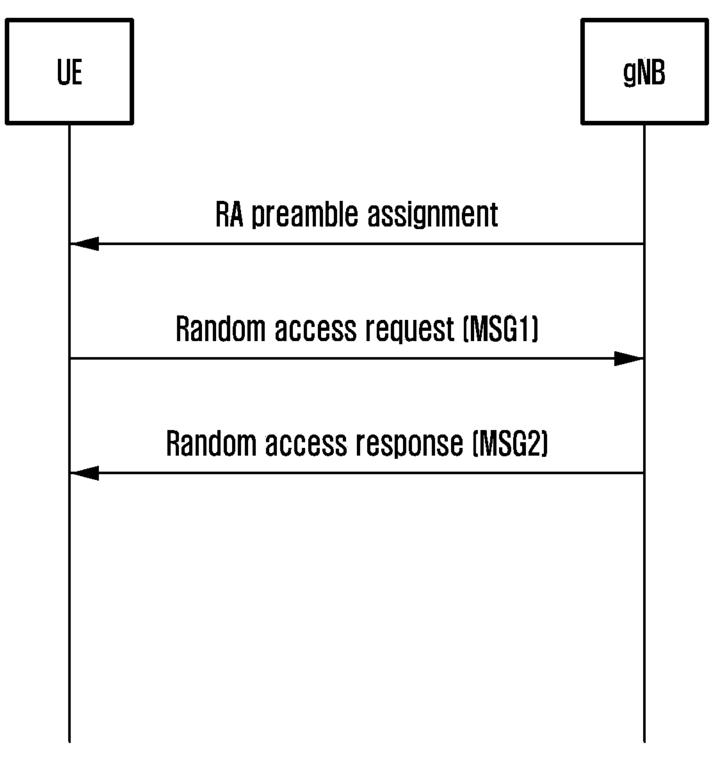
FIG. 2B is a signalling diagram of a contention-free RACH procedure, according to the related art.

In general, a user equipment (UE) needs to perform a Random Access Channel (RACH) procedure to be in-synchronization with the wireless network, acquire dedicated network channel resources, to send data towards the wireless network and receive data from the wireless network. The RACH procedure are of two types. The first type of the RACH procedure is a contention-based RACH procedure comprising exchange of MSG1, MSG2, MSG3 and MSG4 between the UE and a gNB of the wireless network as shown in FIG. 2A). The second type of the RACH procedure is a contention-free RACH procedure as per 3rd generation partnership programme (3GPP) which includes exchange of only the MSG1 and the MSG2 between the UE and the gNB (as shown in FIG. 2B). The RACH procedure may be triggered by any activity at the UE which are defined in the 3GPP specification such as for example but not limited to cell selection, to go from idle/Radio Resource Control (RRC) inactive to connected mode, RRC connection reestablishment, handover, physical downlink control channel (PDCCH) order, loss of uplink (UL) sync, UL grant request after max scheduling request exhaustion, request for system information other than Remaining Minimum System Information (RMSI), beam failure recovery (specially in mmW NR, 6G THz or any other high frequency/beam based cellular systems).

However, the 3GPP specification does not define the required procedure(s) for selection of beam in a multi-beam system or selection of a TRP in the multi-TRP system; UL scheduling, DL scheduling and transmission in the cell-free/multi-TRP system. Thus, it is desired to address the RACH procedure in the multi-TRP system to achieve a system devoid of the above issues.

Accordingly, embodiments herein disclose a method for managing multiple TRPs during RACH procedure within a multi-TRP system in a communication network. The method includes detection, by at least one UE of a plurality of UEs, presence of the multi-TRP system serving in at least one of downlink and uplink and determining, by the at least one UE, at least one first TRP of the plurality of TRPs serving in at least one of downlink and uplink, for transmission of a Random Access Preamble. Further, the method includes determining, by the at least one UE, at least one second TRP of the plurality of TRPs for monitoring a reception of a Random Access Response (RAR) and receiving, by the at least one UE, the RAR on at least one third TRP, wherein the at least one third TRP is determined by a node of the communication network. The method also includes determining, by the at least one UE, at least one fourth TRP of the plurality of TRPs for scheduling PUSCH transmission by a UL grant of the RAR; determining, by the at least one UE, at least one fifth TRP of the plurality of TRPs for monitoring a reception of a contention resolution message; and receiving, by the at least one UE, the contention resolution message on at least one sixth TRP, wherein the at least one sixth TRP is determined by the node of the communication network.

Accordingly, embodiments herein disclose a user equipment (UE) for managing multiple TRPs during RACH procedure within a multi-TRP system in a communication network. The UE includes a memory, a processor, a communicator and a TRP management controller. The TRP management controller is configured to detect presence of the multi-TRP system serving in at least one of downlink and uplink determine at least one first TRP of the plurality of TRPs serving in at least one of downlink and uplink, for transmission of a Random Access Preamble and determine at least one second TRP of the plurality of TRPs for monitoring a reception of a Random Access Response (RAR). Further, the TRP management controller is also configured to receive the RAR on at least one third TRP and determine at least one fourth TRP of the plurality of TRPs for scheduling PUSCH transmission by a UL grant of the RAR. The TRP management controller is then configured to determine at least one fifth TRP of the plurality of TRPs for monitoring a reception of a contention resolution message; and receive the contention resolution message on at least one sixth TRP, wherein the at least one sixth TRP is determined by the node of the communication network.

Accordingly, embodiments herein disclose a node for managing multiple TRPs during RACH procedure within a multi-TRP system in a communication network. The node includes a memory, a processor, a communicator and a node TRP management controller. The node TRP management controller is configured to determine at least one third TRP of a plurality of TRPs for scheduling a transmission of a RAR and schedule the transmission of the RAR on the determined at least one third TRP. The node TRP management controller is configured to determine at least one sixth TRP of the plurality of TRPs for scheduling a transmission of a contention resolution message; and schedule the transmission of the contention resolution message on the determined at least one sixth TRP.

Figure 3:
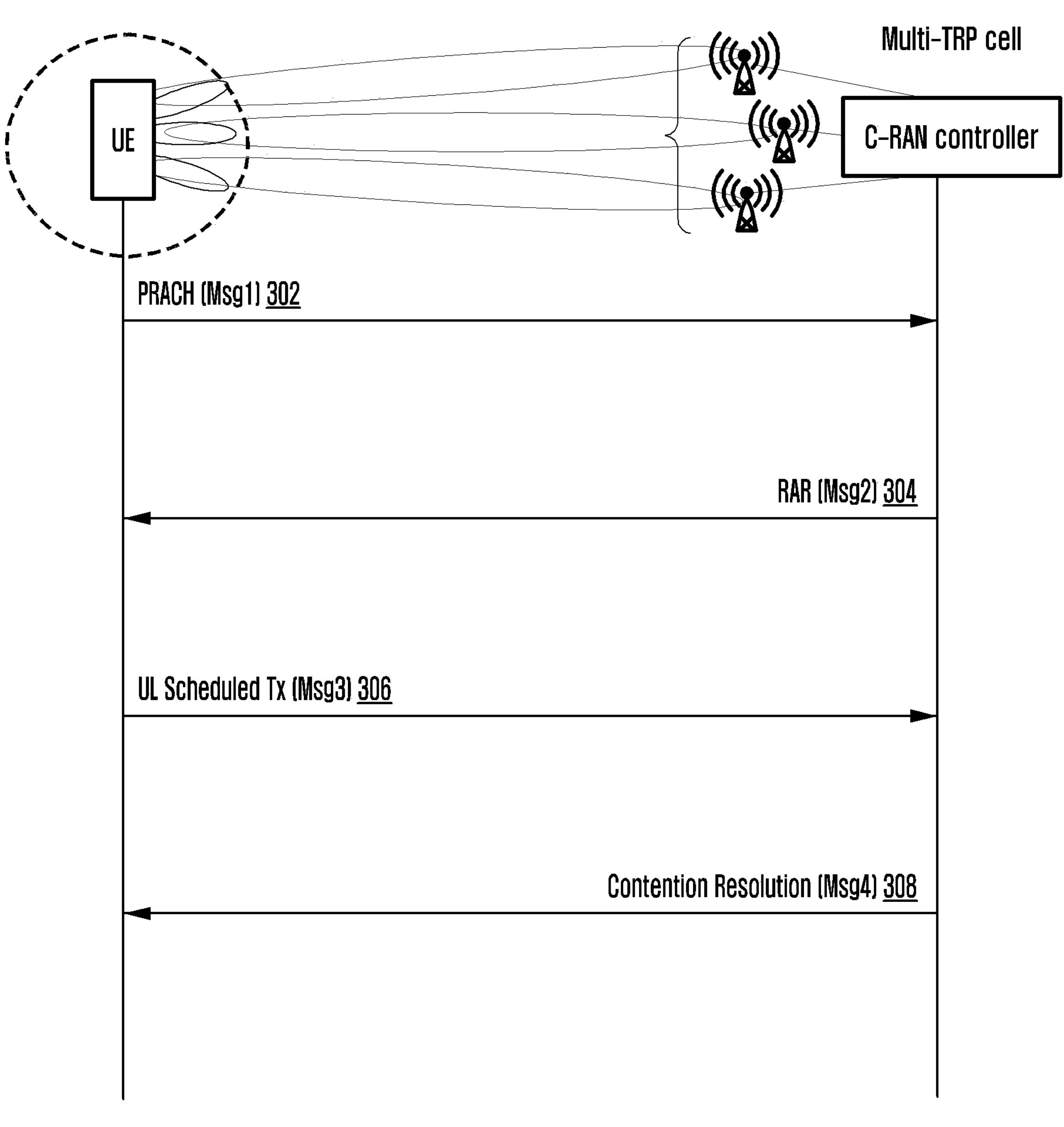
FIG. 3 is a signalling diagram illustrating a RACH procedure in the multiple TRP system, according to the related art.

FIG. 3 is a signalling diagram illustrating a RACH procedure in the multiple TRP system, according to the related art.

Referring to the FIG. 3, at step 302, the UE sends physical random access channel (PRACH) (Msg1) in uplink of the multiple TRP system for initial access requests to a node such as for example a C-RAN Controller of the multiple TRP system. In conventional single TRP NR mmW system, the UE determines the best beam during initial cell selection and uses the determined best beam for the PRACH transmission as well as monitoring on the same for corresponding Msg2 in DL. However, in case of the multiple TRP system, there is no procedure defined for the UE to know whether it is a multi TRP serving system in the DL or the UL. Also, the UE is not aware of that out of the multiple serving beams or in the multi-TRPs, which one(s) are to be used to transmit the PRACH to the C-RAN controller.

At step 304, the C-RAN controller sends RAR (Msg2) to the UE. In the conventional single TRP, the UE only monitors the best serving DL beam and a node of the wireless network schedules and transmits the Msg2 (physical downlink control channel (PDCCH)-Physical downlink shared channel (PDSCH) on the best serving DL beam.

However, the conventional methods does not disclose which of the beams in the multi-beam system or which of the TRPs in the multi-TRP system does the UE have to monitor in the DL to receive the Msg2 and how the wireless network identifies the possible DL serving beam/TRPs where the Msg2 needs to be transmitted. Further, the conventional methods also does not define the mechanism for DL scheduling and transmission of the Msg2 (PDCCH-PDSCH) when there are multiple DL serving beams or the TRPs.

At step 306, the UE sends uplink (UL) Scheduled Tx (Msg3) to the C-RAN controller. In the conventional methods, the UE (re) transmits the Msg3 on same single serving beam. However, out of the multiple UL serving beams or the multiple-TRPs, where does the UE transmit the Msg3 is not defined. Also, in case of HARQ Retransmission of the Msg3, a procedure of re-evaluating the UL beam/TRPs for ReTx by the UE is not defined.

At step 308, the C-RAN controller sends a contention Resolution (Msg4) to the UE. In the conventional methods, the UE only monitors the best serving DL beam and the network schedules and transmits the Msg4 (PDCCH-PDSCH) on the best serving DL beam.

However, the beams of the multi-beams or the multi-TRPs which the UE shall monitor in the DL to receive the Msg4 is not clear. Also, the mechanism for DL scheduling and transmission of the Msg4 (PDCCH-PDSCH) when there are multiple DL serving beam/TRPs is not defined. Hence, it is required to address the above mentioned problems.

Referring now to the drawings, and more particularly to FIGS. 4 through 18, where similar reference characters denote corresponding features consistently throughout the figures, there are shown preferred embodiments.

Figure 4:
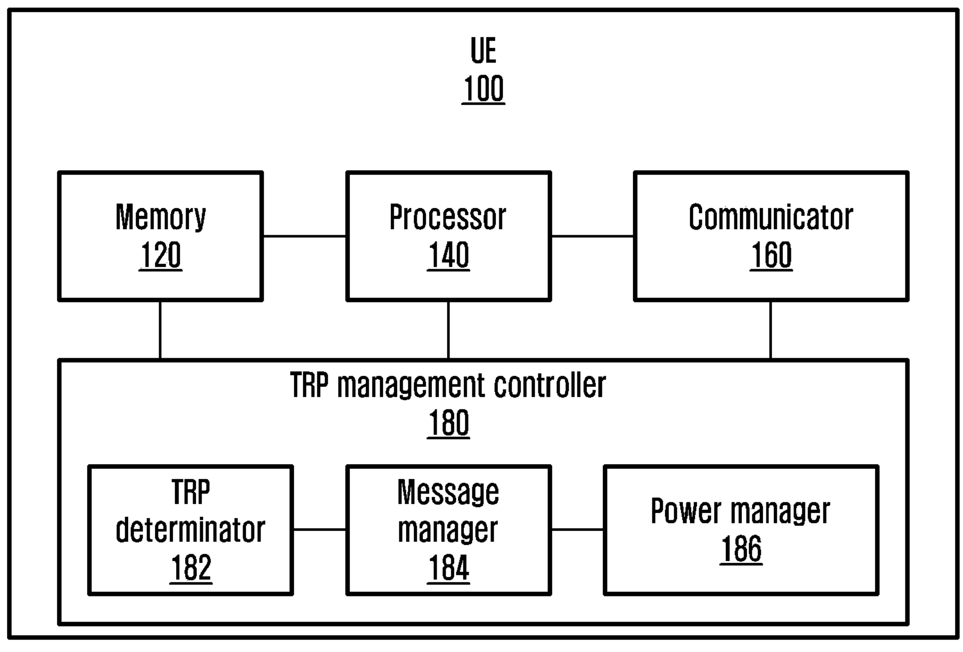
FIG. 4 illustrates a block diagram of a UE of the multi-TRP system for managing multiple TRPs during the RACH procedure in a communication network, according to an embodiment as disclosed herein.

FIG. 4 illustrates a block diagram of a UE (100) of a multi-TRP system for managing multiple TRPs during RACH procedure in a communication network, according to an embodiment as disclosed herein. Referring to the FIG. 4, consider a multiple TRP system which includes multiple TRPs and the UE (100). The multiple TRP system enables a node (200) of the network to use more than one TRP to communicate to the UE (100). The UE (100) includes a memory (120), a processor (140), a communicator (160) and a TRP management controller (180). The TRP management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the TRP management controller (180). The processor (140) is configured to execute instructions stored in the memory (120) and to perform various processes. The processor (140) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the UE (100) and with external devices via one or more networks.

In an embodiment, the TRP management controller (180) includes a TRP determinator (182), a messages manager (184) and a power manager (186).

The TRP determinator (182) is configured to detects a presence of the multi-TRP system serving in downlink or uplink based on an existing system information (SI), a new SI, a layer3 (L3) signalling broadcast message, a layer1 (L1) message or a layer2 (L2) message, etc.

The TRP determinator (182) is configured to determine a first TRP serving in either the downlink or the uplink for transmission of a Random Access Preamble. The UE (100) selects the random access preamble from a set of predefined preambles. These preambles can be for example a short preamble format and a long preamble format. The UE (100) also selects a random sequence number for the preamble. After choosing the preamble and sequence number, the UE (100) transmits the preamble on a Physical Random Access Channel (PRACH). The PRACH preamble consists of a cyclic prefix, useful part of a sequence and then a guard period which is simply an unused portion of time up to the end of the last subframe occupied by the PRACH.

The TRP determinator (182) to determine the first TRP, receives the power consumption aspect associated with the UE (100) from the power manager (186). Further, the TRP determinator (182) determines the transmission of the Random Access Preamble on the first TRP based on the power consumption aspect associated with the UE (100). Further, the TRP determinator (182) determines the first TRP serving in the downlink and the uplink, for the transmission of the Random Access Preamble. This determination is performed based on the node configuring a set of identities (ID) associated with the first TRP to be used for sending the Random Access Preamble by the UE (100) and/or the UE (100) selecting the first TRP based on a threshold criteria. The threshold criteria is a minimum Synchronization Signal Block (SSB), a minimum Channel State Information Reference Signal (CSI-RS) reference signal received power (RSRP) threshold criteria and a path loss evaluation for each TRP of the multiple TRPs.

Further, the TRP determinator (182) is configured to determine a second TRP for monitoring a reception of a Random Access Response (RAR). The RAR is also known as Msg2. On receiving the Msg1, the node (200) sends a response called the Msg2. The Msg2 includes various details such as Time Advance (TA) command for timing adjustment, RAPID (Random Access Preamble ID) matching the preamble sent by the UE (100) and an initial uplink grant for the UE (100). The TRP determinator (182) determines the second TRP for monitoring the reception of the RAR by: listening on each of the plurality of TRPs serving in the DL or monitoring the first TRP.

The TRP determinator (182) is also configured to determine a fourth TRP for scheduling Physical Uplink Shared Channel (PUSCH) transmission by a UL grant of the RAR. In an example but not limited to, the fourth TRP is same as the first TRP used for transmission of the Random Access Preamble. The TRP determinator (182) also determines a next fourth TRP for scheduling the PUSCH transmission by the UL grant of the RAR. The scheduling of the PUSCH transmission is based on a priority associated with the plurality of TRPs, a validity time and the pathloss evaluation.

The TRP determinator (182) is configured to determine a fifth TRP for monitoring a reception of a contention resolution message. The contention resolution message is also known as Msg4. In an example but not limited to, the fifth TRP for monitoring the reception of the contention resolution message is same as the first TRP and the next fourth TRP.

In an embodiment, the messages manager (184) is configured to manage all the messages which includes the Msg1, the Msg2, the Msg3 and the Msg4. The messages manager (184) is configured to monitor the reception of the RAR on the second TRP. The messages manager (184) is configured to receive the RAR on the third TRP which is determined by the node (200) of the communication network. The messages manager (184) is configured to monitor the reception of the contention resolution message using the fifth TRP and receive the contention resolution message on a sixth TRP. Here, the sixth TRP is determined by the node (200) of the communication network. The messages manager (184) is configured to process a received PDSCH and stop the monitoring of the multiple TRPs.

In an embodiment, the power manager (186) is configured to determine a power consumption aspect associated with the UE (100) and share the power consumption aspect associated with the UE (100) with the TRP determinator (182). The power consumption aspect associated with the UE (100) includes transmission power, battery consumption, heating effects.

The power manager (186) is configured to stop the monitoring of the second TRP and the fifth TRP for power optimization at the UE (100) and monitor only the first TRP used for the transmission of the Random Access Preamble, based on the power consumption aspect associated with the UE (100). This is due to the UE (100) requiring to monitor more than one beam or more than one TRP in the DL or the UL. Though the power management is implemented at the UE (100), the node (200) needs to ensure to at least respond with PDCCH-PDSCH Msg2/Msg4 over the corresponding DL beam/TRP to the ones associated where the PRACH Msg1/Msg3 is actually transmitted by the UE (100).

At least one of the plurality of modules/components of the TRP management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 4 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function in the UE (100).

Figure 5:
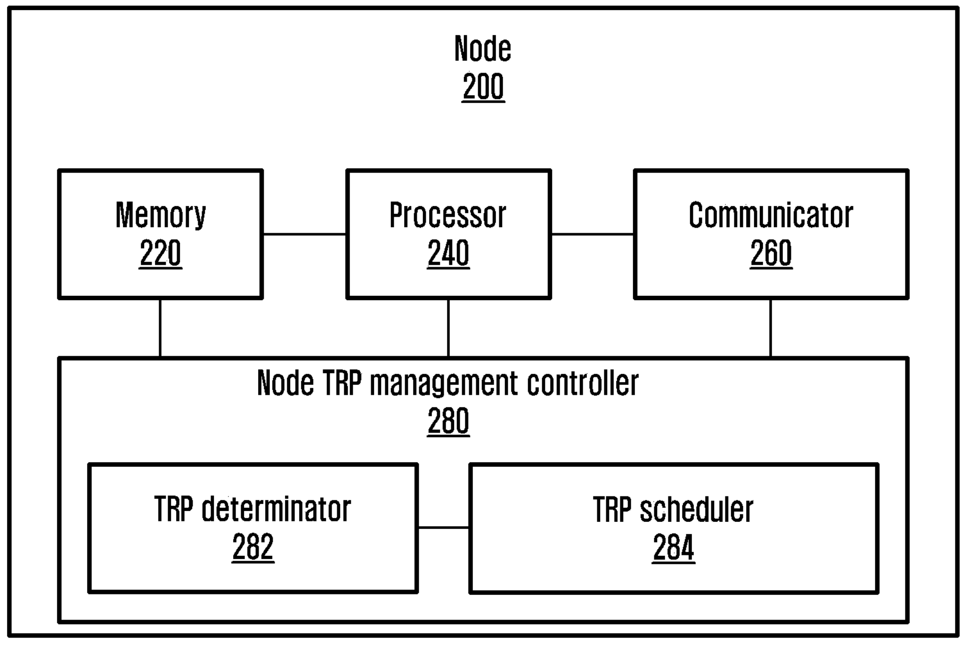
FIG. 5 illustrates a block diagram of a node of the communication network for managing the multiple TRPs during the RACH procedure, according to an embodiment as disclosed herein.

FIG. 5 illustrates a block diagram of the node (200) of the communication network for managing the multiple TRPs during the RACH procedure, according to an embodiment as disclosed herein. The node (200) includes a memory (220), a processor (240), a communicator (260) and a node TRP management controller (280). The node TRP management controller (280) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (220) is configured to store instructions to be executed by the processor (240). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information. In certain examples, a non-transitory storage medium may store data that can, over time, change (e.g., in Random Access Memory (RAM) or cache).

The processor (240) communicates with the memory (220), the communicator (260) and the node TRP management controller (280). The processor (240) is configured to execute instructions stored in the memory (220) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (260) includes an electronic circuit specific to a standard that enables wired or wireless communication. The communicator (260) is configured to communicate internally between internal hardware components of the node (200) and with external devices via one or more networks.

In an embodiment, the node TRP management controller (280) includes a TRP determinator (282) and a TRP scheduler (284).

In an embodiment, the TRP determinator (282) is configured to determine a third TRP of the plurality of TRPs for scheduling a transmission of a RAR to the UE (100) from the node (200). The RAR is also known as Msg2. The TRP determinator (282) is also configured to determine a sixth TRP of the plurality of TRPs for scheduling a transmission of a contention resolution message. The contention resolution message is also known as Msg4 which comprises a contention resolution ID.

In an embodiment, the TRP scheduler (284) is configured to schedule the transmission of the RAR on the determined third TRP by the node (200). The TRP scheduler (284) is also configured to schedule the transmission of the contention resolution message on the determined sixth TRP. The RAR and the contention resolution message which are scheduled on the respective TRPs are then sent to the UE (100) based on the schedule. The RAR Msg2 and the RAR Msg4 are scheduled on the third TRP and the sixth TRP respectively, using a single PDCCH or DCI; or multiple PDCCH or DCI over the TRPs. In order to schedule the RAR Msg2 and the RAR Msg4 on the third TRP and the sixth TRP respectively, Reserved bits in a scheduling format of a DL DCI are used. The reserved bits are used to indicate the multiple TRP scheduling in the DL. Further, a bitmap is added at an end portion of the scheduling format of the DL DCI to provide the identities of the third TRP and the sixth TRP, respectively. The third TRP and the sixth TRPs are used for transmission of the messages from the node (200) to the UE (100).

At least one of the plurality of modules/components of the node TRP management controller (280) may be implemented through an AI model. A function associated with the AI model may be performed through memory (220) and the processor (240). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 5 shows various hardware components of the node (200) but it is to be understood that other embodiments are not limited thereon. In other embodiments, the node (200) may include less or more number of components. Further, the labels or names of the components are used only for illustrative purpose and does not limit the scope of the disclosure. One or more components can be combined together to perform same or substantially similar function in the node (200).

Figure 6:
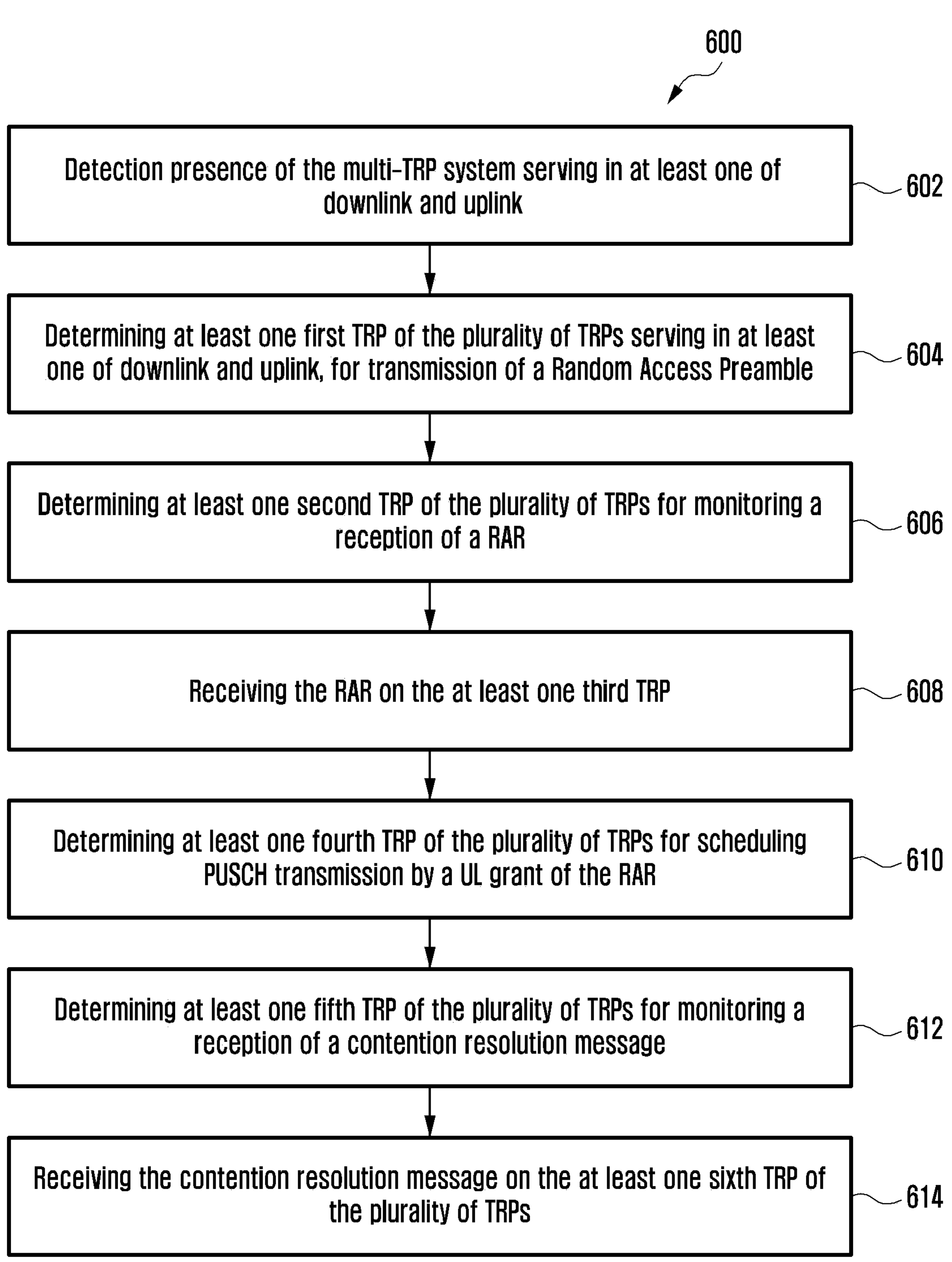
FIG. 6 is a flow diagram illustrating a method for managing the multiple TRPs during the RACH procedure within the multi-TRP system in the communication network, according to an embodiment as disclosed herein.

FIG. 6 is a flow diagram (600) illustrating a method for managing the multiple TRPs during the RACH procedure within the multi-TRP system in the communication network, according to an embodiment as disclosed herein.

Referring to the FIG. 6, at step 602 the method includes the UE (100) detecting the presence of the multi-TRP system serving in either the downlink or the uplink. For example, in the UE (100) described in the FIG. 4, the TRP management controller (180) is configured to detect the presence of the multi-TRP system serving in either the downlink or the uplink.

At step 604, the method includes the UE (100) determining the first TRP of the plurality of TRPs serving in the downlink or the uplink, for transmission of the Random Access Preamble. For example, in the UE (100) described in the FIG. 4, the TRP management controller (180) is configured to determine the first TRP of the plurality of TRPs serving in the downlink or the uplink, for transmission of the Random Access Preamble.

At step 606, the method includes the UE (100) determining the second TRP of the plurality of TRPs for monitoring the reception of the RAR. For example, in the UE (100) described in the FIG. 4, the TRP management controller (180) is configured to determine the second TRP of the plurality of TRPs for monitoring the reception of the RAR.

At step 608, the method includes the UE (100) receiving the RAR on the third TRP. For example, in the UE (100) described in the FIG. 4, the TRP management controller (180) is configured to receive the RAR on the third TRP.

At step 610, the method includes the UE (100) determining the fourth TRP of the plurality of TRPs for scheduling the PUSCH transmission by the UL grant of the RAR. For example, in the UE (100) described in the FIG. 4, the TRP management controller (180) is configured to determine the fourth TRP of the plurality of TRPs for scheduling the PUSCH transmission by the UL grant of the RAR.

At step 612, the method includes the UE (100) determining the fifth TRP of the plurality of TRPs for monitoring the reception of the contention resolution message. For example, in the UE (100) described in the FIG. 4, the TRP management controller (180) is configured to determine the fifth TRP of the plurality of TRPs for monitoring the reception of the contention resolution message.

At step 614, the method includes the UE (100) receiving the contention resolution message on the sixth TRP of the plurality of TRPs. For example, in the UE (100) described in the FIG. 4, the TRP management controller (180) is configured to receive the contention resolution message on the sixth TRP of the plurality of TRPs.

The various actions, acts, blocks, steps, or the like in the flow diagram (600) may be performed in the order presented, in a different order or simultaneously. Further, in some embodiments, some of the actions, acts, blocks, steps, or the like may be omitted, added, modified, skipped, or the like without departing from the scope of the disclosure.

Figure 7:
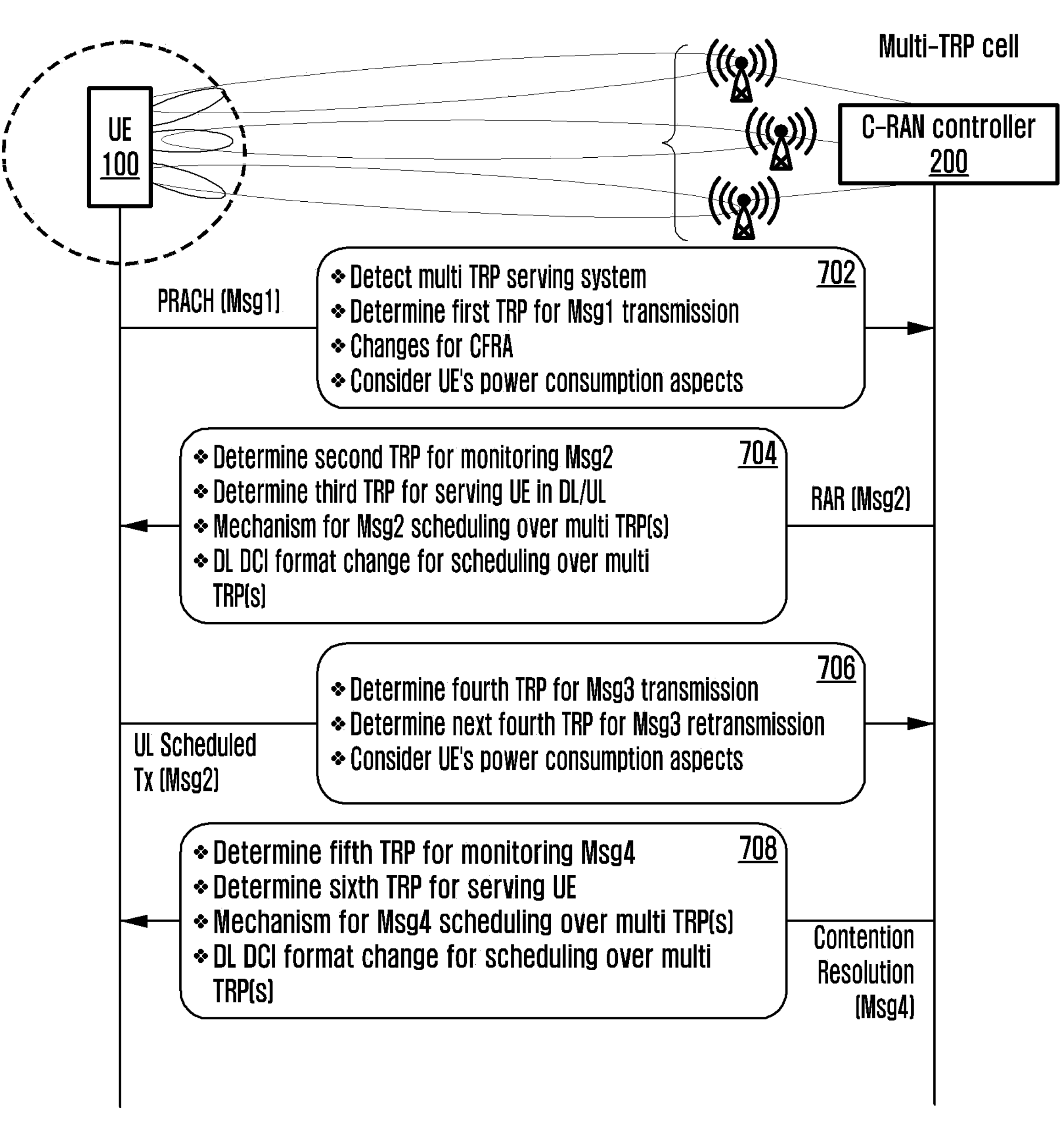
FIG. 7 is a signalling diagram illustrating an overview of the method for managing the multiple TRPs during the RACH procedure within the multi-TRP system in the communication network, according to an embodiment as disclosed herein.

FIG. 7 is a signalling diagram illustrating an overview of the method for managing the multiple TRPs during the RACH procedure within the multi-TRP system in the communication network, according to an embodiment as disclosed herein.

Referring to the FIG. 7 in conjunction with the FIG. 3, at step 702, the UE (100) determines the multi TRP serving system in the DL or the UL. The UE (100) also determines the first TRP out of the multiple serving beams or in the multi-TRPs, which is serving in either the downlink or the uplink for transmitting the Msg1 to the node (200) which is the C-RAN controller (200) in the FIG. 7.

At step 704, the C-RAN controller (200) sends the RAR (Msg2) to the UE (100). In the proposed method, the UE (100) determines the second TRP which is to be monitored in the DL to receive the Msg2. The proposed method also provides the mechanism by which the C-RAN controller (200) identifies the third TRP for serving in the DL where the Msg2 is to be transmitted. Further, the proposed method also defines the mechanism for the DL scheduling and transmission of the Msg2 (PDCCH-PDSCH) on the determined TRPs. Further, the proposed method also provides DL DCI format change for scheduling over multi TRP(s) (further explained with respect to FIG. 14).

At step 706, the UE (100) sends uplink (UL) Scheduled Tx (Msg3) to the C-RAN controller (200). The proposed method includes determining by the UE (100) the UL serving TRPs for transmitting by the UE (100) the Msg3. Also, when the HARQ Retransmission of the Msg3 occurs the procedure of re-evaluating the UL beam/TRPs for ReTx by the UE (100) is provided.

At step 708, the C-RAN controller (200) sends the Msg4 to the UE (100). The UE (100) determines the fifth TRP for monitoring the Msg4; and the network schedules and transmits the Msg4 (PDCCH-PDSCH) on the sixth TRP. Further, the proposed method also provides DL DCI format change for scheduling over multi TRP(s) (further explained with respect to FIG. 17).

Figure 8:
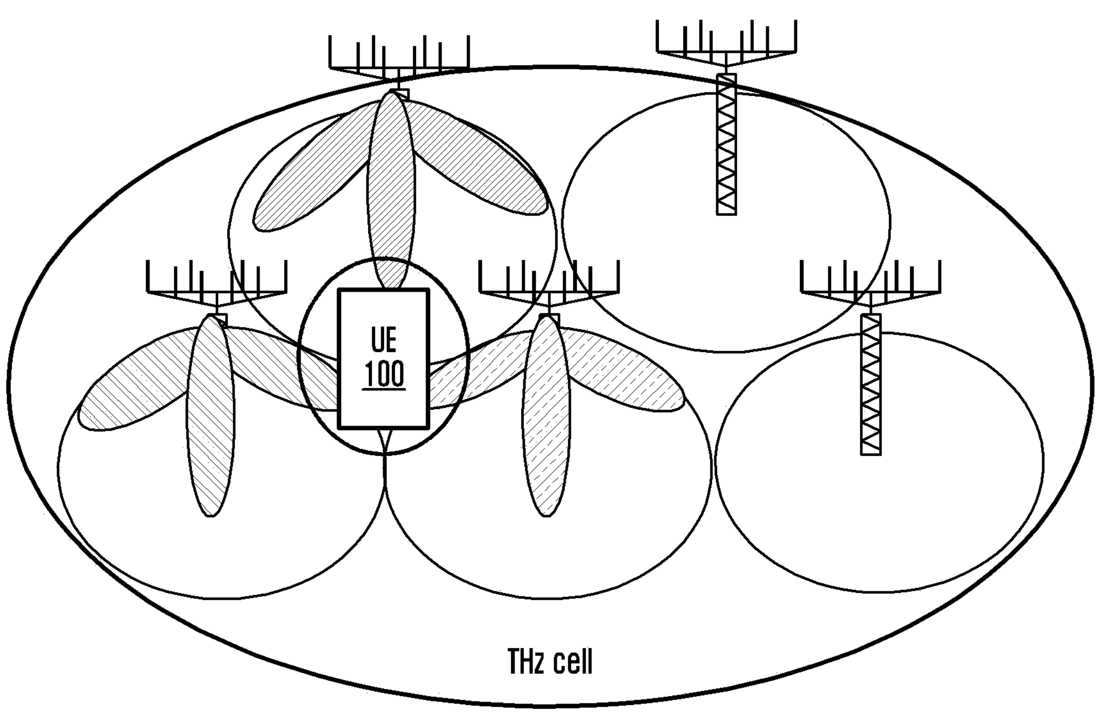
FIG. 8 is an example illustrating a scenario of multiple TRPs during the RACH procedure within the multi-TRP system in the communication network, according to an embodiment as disclosed herein.

FIG. 8 is an example illustrating a scenario of multiple TRPs during the RACH procedure within the multi-TRP system in the communication network, according to an embodiment as disclosed herein. Referring to the FIG. 8, in the cell free or the multi TRP system, the UE (100) can be served by the multiple TRPs (forming a single serving cell) in the DL or the UL at the same time.

The multiple TRPs can be either configured by the node (200) (in a network centric cluster) or the multiple TRPs may have been selected by the UE (100) (in the UE centric cluster). So, when the UE (100) wants to initiate the RACH procedure, then the UE (100) should be aware of the presence of the multi TRP serving in the DL or the UL and the UE (100) needs to determine the uplink beam or the TRP where it can perform the RACH procedure.

FIGS. 9A-B illustrates layer 3 signalling broadcast message and any other layer 1 or layer 2 message for informing the UE (100) about the multi TRP system by the node (200), according to an embodiment as disclosed herein. In the proposed method, the node (200) informs the UE (100) about the multi TRP system through a System Information (SI). The SI can be any existing SI or a new SI or more generically a layer 3 signalling broadcast message or any other layer 1 or layer 2 message. Referring to the FIG. 9A, the node (200) informs the UE (100) about the multi TRP system through the SI where the node (200) can broadcast a list of TRP ID(s) indicating support or the presence of the multiple TRPs.

Referring to the FIG. 9B, the node (200) broadcasts the presence of the multi TRP system along with the characteristics of the multi TRP system through SIB1, other SI or layer3 signalling broadcast message containing proposed IE "Uplink on Multi TRP or UL on multi TRP" and/or "Downlink on multi TRP" or "DL on multi TRP".

Furthermore, the node (200) may also provide a list of the multi TRP for searching and synchronizing with the network. The list of the multi TRPs can be shared in any SI or the RRC or any layer 2 message like through Media Access Control (MAC) control element or can also be part of layer 1 message which is based on Downlink Control Information (DCI). The node (200) can also share the criteria to camp or synchronize on these TRP (validity timer, threshold). The UE (100) can synchronize on the multi TRPs based UE type, location, capability, requirement of data and the likes.

Figure 10:
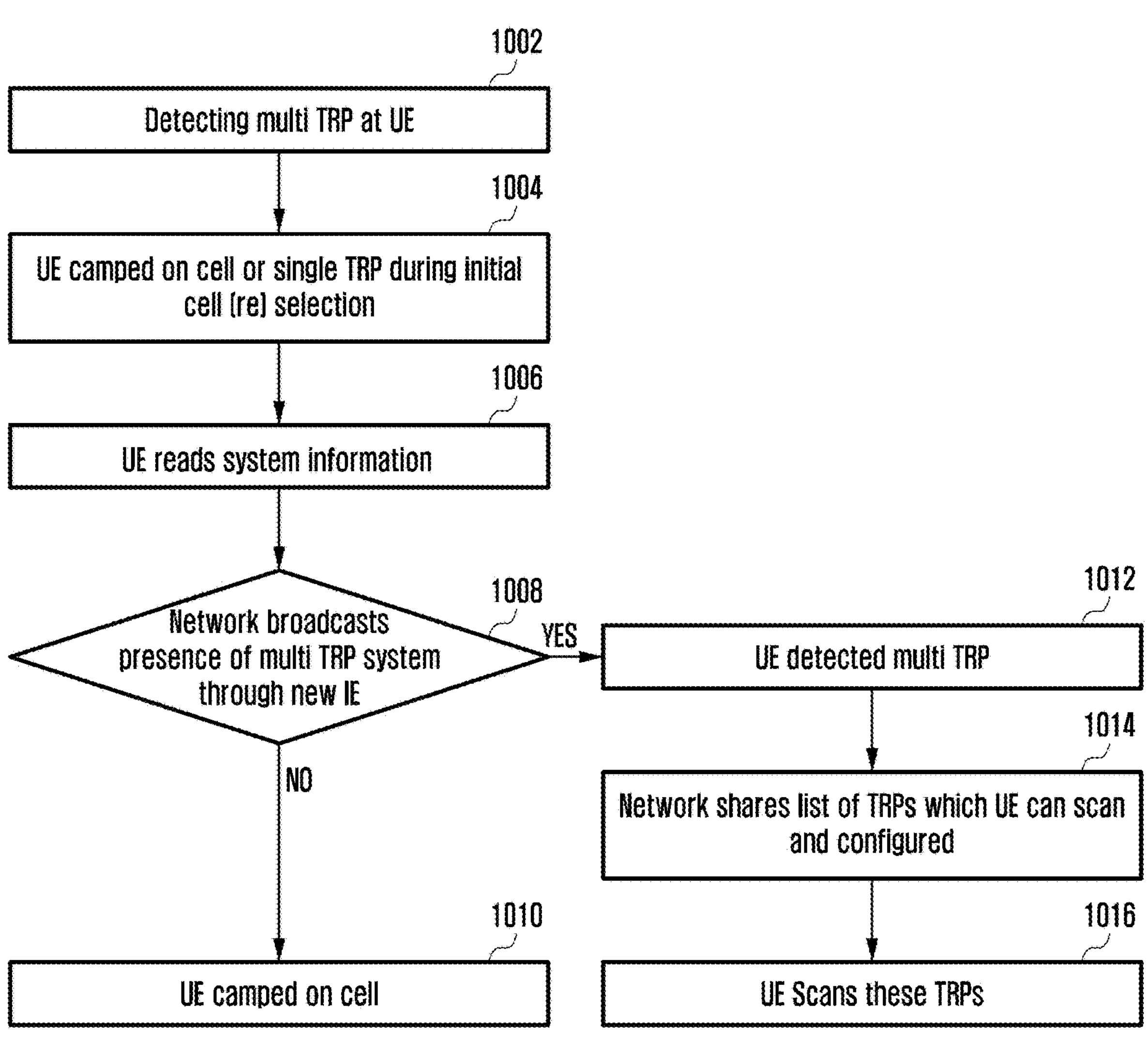
FIG. 10 is a flowchart for detection of support of the multi TRP serving system, according to an embodiment as disclosed herein.

FIG. 10 is a flowchart for detection of support of the multi TRP serving system, according to an embodiment as disclosed herein. Referring to the FIG. 10, at step 1002, the UE (100) detects the presence of the multi TRP and at step 1004, the UE (100) camps on the cell or the single TRP during initial cell (re) selection. Further, at step 1006, the UE (100) reads the system information. At step 1008, the UE (100) determines whether the node (200) broadcasts the presence of the multi TRP system through a new IE. At step 1010, the UE (100) camps on the cell, in response to determining that the node (200) does not broadcast the presence of the multi TRP system through the new IE. At step 1012, the UE (100) detects the multi TRP, in response to determining that the node (200) broadcasts the presence of the multi TRP system through the new IE. Further, at step 1014, the node (200) shares list of TRPs which the UE (100) can scan and get configured; and at step 1016 the UE (100) scans the TRPs present in the list of TRPs provided by the node (200).

Figure 11:
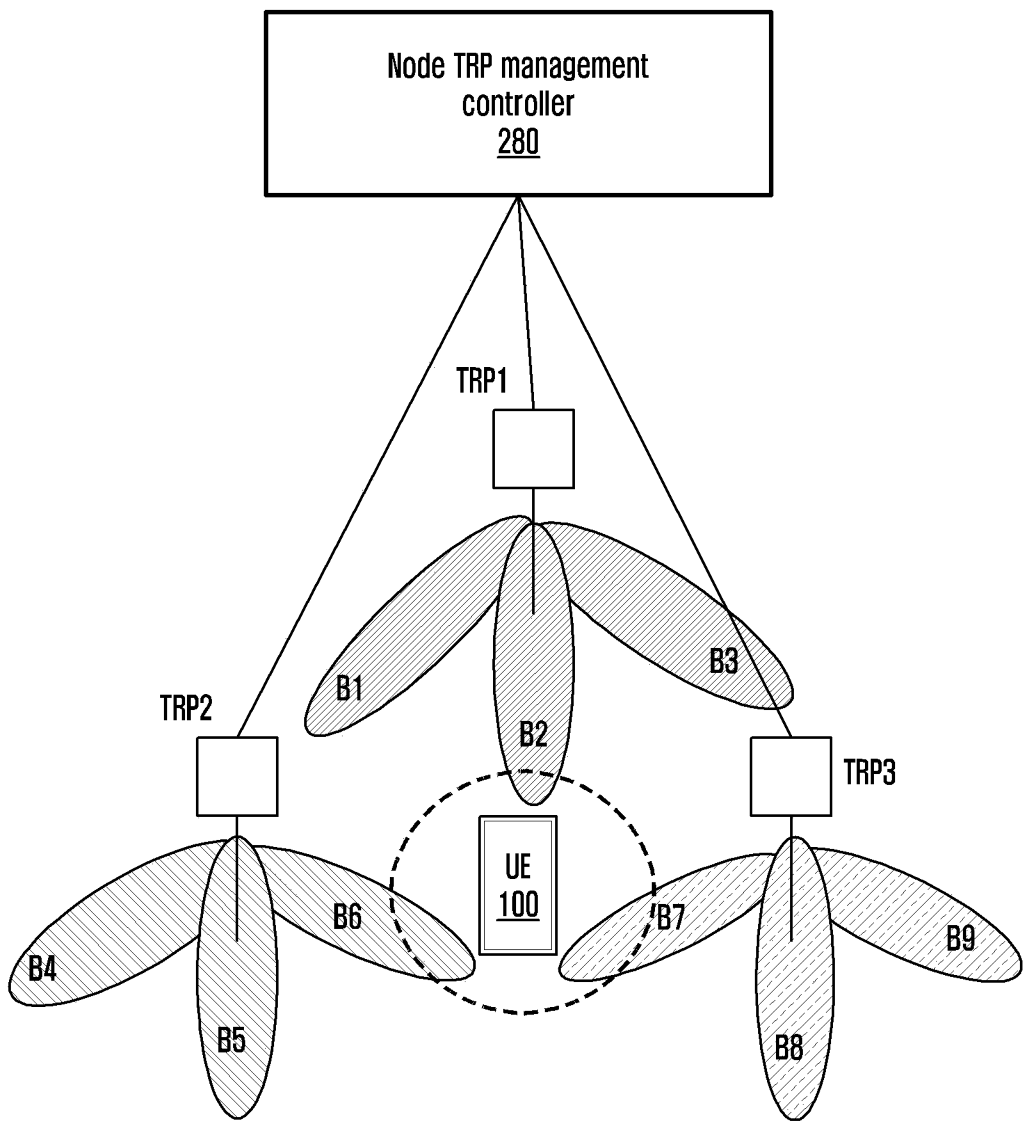
FIG. 11 illustrates a selection of a UL beam or the TRP(s) for transmission of a Msg1, according to an embodiment as disclosed herein.

FIG. 11 illustrates a selection of the UL beam or the TRP(s) for transmission of the Msg1, according to an embodiment as disclosed herein. The selection of the UL beam or the TRP(s) for the transmission of the Msg1 is provided. The proposed method provides two different methods to identify the best beam or the best TRP(s) in the UL to perform the RACH by the UE (100). Further, the UE (100) decides whether the UE (100) needs to send the RACH Msg1 on only one or more than one best beam or the best TRP(s) in the UL, based on the power consumption aspects (battery remaining, overheating etc.) of the UE (100).

The first method includes the node (200) broadcasts the list of TRP ID(s) indicating support or the presence of the multi TRP through the SI. In the list of TRP ID(s) broadcasted, a subset of the TRP ID(s) can be configured by the node (200) to be used for sending the RACH by the UE (100).

In the second method the selection of the uplink TRP is performed by the UE (100) based on threshold criteria. The threshold criteria can be configured by node (200) as a minimum SSB/CSI-RS RSRP threshold criteria or as the path loss evaluation for each serving TRP.

Referring to the FIG. 11, consider a multi-TRP system comprising three TRPs i.e., TRP1, TRP2 and TRP3 which are all centrally connected to the node TRP management controller (280). Further, consider that each of the three TRPs in turn transmits three beams. The TRP1 is associated with beams B1, B2 and B3, the TRP2 with is associated with beams B4, B5 and B6; and the TRP3 is associated with the beams B7, B8 and B9.

Consider the UE (100) is in the vicinity of all the three TRPs and the UE (100) is able to detect the beams B2, B6 and B7 (as serving). In the proposed method the UE (100) decides whether the UE (100) needs to send the RACH Msg1 on only one or more than one of the beams B2, B6 and B7 in the UL, based on the power consumption aspects of the UE (100). Further, the UE (100) may use the subset of the TRP ID(s) which are configured by the node (200) to be used for sending the RACH or the uplink TRP may be selected based on threshold criteria.

Figure 12:
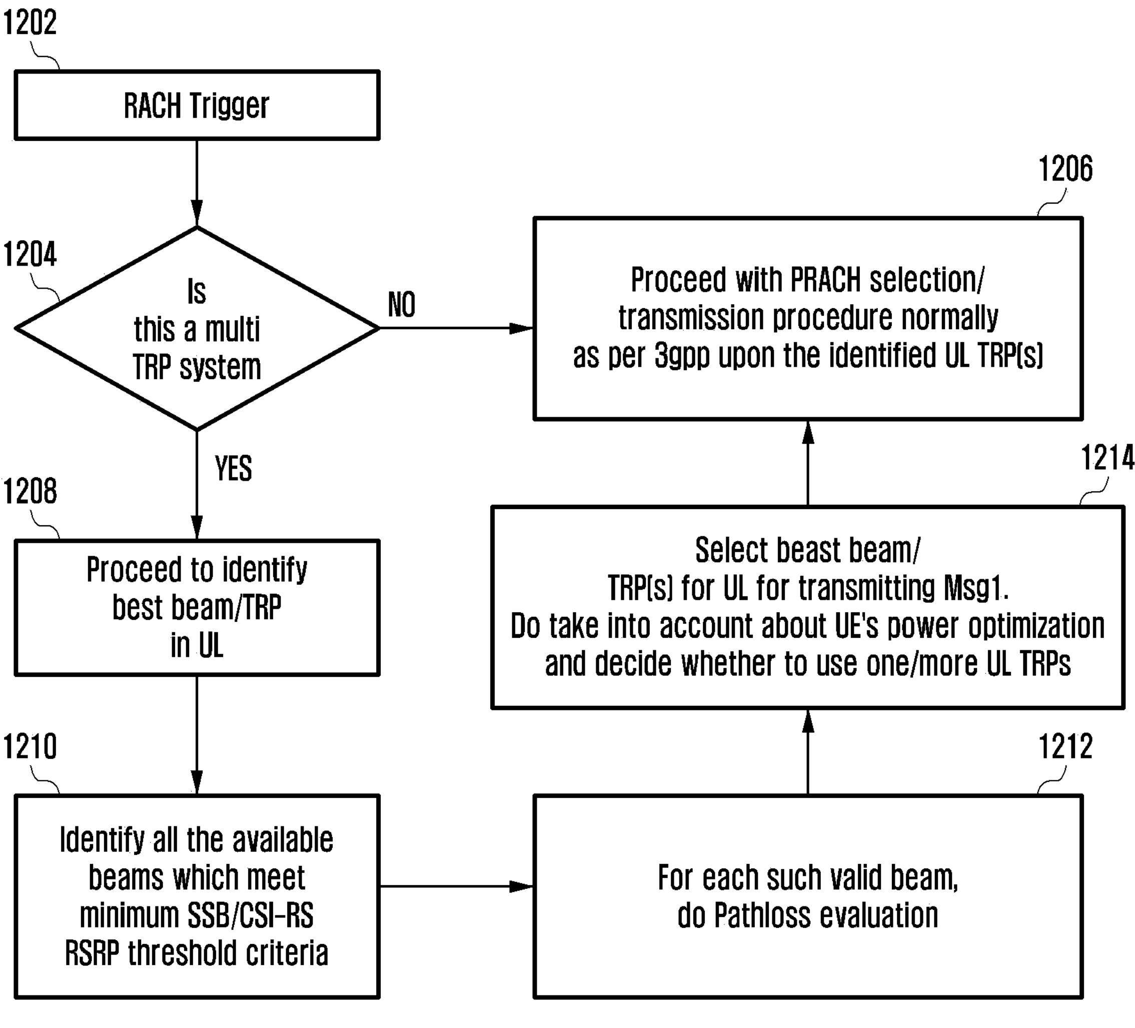
FIG. 12 is a flowchart for the selection of the UL beam or the TRP(s) for the transmission of the Msg1 by the UE, according to an embodiment as disclosed herein.

FIG. 12 is a flowchart for the selection of the UL beam or the TRP(s) for the transmission of the Msg1 by the UE (100), according to an embodiment as disclosed herein.

Referring to the FIG. 12, at step 1202, the method includes triggering the RACH by the UE (100) and at step 1204, the method includes determining whether the multi TRP system is present. At step 1206, the UE (100) proceeds with the PRACH selection or the transmission procedure normally as per 3GPP specification upon the identified UL TRP(s), in response to determining that the multi TRP system is not present.

At step 1208, the UE (100) proceeds to identify the best beam or the TRP in the UL. Further, at step 1210, the method includes the UE (100) identifying all the available beams which meet the minimum SSB/CSI-RS RSRP threshold criteria. At step 1212, for each such valid beam performing the pathloss evaluation and at step 1214, the method includes selecting the beast beam or the TRP(s) for the UL for transmitting the Msg1. Further, the method considers power optimization of the UE (100) and decide whether to use one/more UL TRPs.

In another embodiment, where the Contention Free Random Access (CFRA) procedure is performed where dedicated RACH preamble and resource are already configured by the node (200) in the multi TRP cellular system, the node (200) shall also inform the UE (100) about dedicated TRPID(s) either via RRC signalling or layer2 control element or layer1 signalling i.e. DCI, to perform the CFRA.

FIG. 13 illustrates multiple ways to schedule RAR Msg2 in the multi TRP cellular system, according to an embodiment as disclosed herein.

Referring to the FIG. 13, in the proposed method after the transmission of the RACH Msg1, the UE (100) monitors the DL channel for the Msg2 from the node (200) (scrambled with the RA-RNTI, within Random Access Response window as per the 3GPP specification). Since, there can be more than one TRPs serving the UE (100) in the DL in the multi TRP cellular system various aspects needs to be considered for receiving the Msg2 in the DL which includes the UE (100) deciding the beams or the TRPs to monitor in the DL to receive the Msg2, the node (200) deciding possible DL serving beam or the TRPs where the Msg2 shall be transmitted and the need to define mechanism of the DL scheduling and transmission of the Msg2 (PDCCH-PDSCH) in the multi TRP serving scenario.

In an embodiment, the UE (100) chooses to listen on all the serving TRPs in the DL. A further optimized way is to monitor at least those TRPs of the plurality of TRPs in the DL which meet the criteria of the best beam or the TRP selection in the step of the Msg1.

In another embodiment, the node (200) can identify the DLs serving TRPs to be used for the Msg2 scheduling in a network centric cluster (where serving TRPs forming the cell is decided by the node (200)), the node (200) is aware of the DL serving TRPs. Hence, the node (200) has the flexibility to schedule the RAR PDCCH and PDSCH on either any TRP other than TRP where the PRACH is received or more than one TRP(s) which is serving the UE (100) in the DL.

In yet another embodiment, the node (200) can identify the DLs serving TRPs to be used for the Msg2 scheduling in a UE centric cluster (where serving access points or TRPs are chosen by the UE (100)), the node (200) may not be fully aware of exactly which all TRP(s) are serving the UE (100) in the DL (before initial sync) but still the node (200) identifies all such serving TRPs by associating the TRP's relative beam position with the beam or the TRP on which the PRACH Msg1 is received (TRP/beam correspondence).

In yet another embodiment, when the DL serving TRPs are identified then the node (200) needs to decide the mechanism of the DL Msg2 scheduling. The DL Msg2 scheduling can be performed by the node (200) in two ways. In the first way, the node (200) decides to schedule only one RAR Msg2 on only one serving DL TRP (as performed in the existing 3GPP format) (as shown in the FIG. 13A). In the second way, the node (200) decides to schedule more than one RAR Msg2 on the multiple serving DL TRPs (as shown in the FIG. 13B). The scheduling of more than one RAR Msg2 on the multiple serving DL TRPs helps in increasing the reliability of Msg2 success. Here, the node (200) further decides whether to schedule more than one RAR Msg2 via 'only one PDCCH/DCI' or via multiple PDCCH/DCI (multiple PDCCH-PDSCH pair) over multiple serving TRPs (as shown in the FIG. 13C).

FIG. 14 illustrates a scenario of making use of existing Reserved bits of NR DL DCI format 1_0 for Msg2, according to an embodiment as disclosed herein.

Referring to the FIG. 14, the proposed method includes redefining the scheduling format of the DL DCI 1_0 format to schedule by the node (200) the multiple Msg2 over the multiple serving DL TRPs via one PDCCH/DCI. Here, the Reserved bits in the DL DCI 1_0 format is used to indicate multiple TRP scheduling in the DL. Further, the proposed bitmap is added at the end of the existing DCI format to indicate the scheduled TRP's IDs. The leftmost 1st bit is used as an indicator of the presence of multiple TRPs scheduled in the DL, where bit value=1 indicates presence of multiple DL scheduled TRPs as "yes". Furthermore, when the leftmost bit is set to 1, the UE (100) shall read the TRP bitmap present at the end of the Reserved field. New bitmap is used to indicate the beam or the TRP IDs of the DL serving TRPs over which the node (200) wants to schedule the DL PDSCH Msg2 for the RAR.

For example, in the FIG. 13B, once the UE (100) receives such a DL DCI message, the UE (100) should monitor the DL beam or the TRP IDs 2, 6 and 7 (as indicated in the FIG. 11 and assuming that the node (200) is scheduled RAR Msg2 on these 3 TRPs).

FIG. 15 is a flowchart illustrating RACH Msg1 transmission, RAR Msg2 monitoring within RAR window and failure scenario handling, Msg2 scheduling mechanism via DL DCI over one/more DL serving TRPs, Msg2 PDSCH reception and decoding, according to an embodiment as disclosed herein. At step 1502, the UE (100) transmits the Msg1 over the determined best UL TRPs and at step 1504, the UE (100) monitors the best DL TRPs for the DCI within the RAR Window.

At step 1506, the UE (100) determines whether the RAR window timer is expired. At step 1508, the UE (100) declares the RACH Attempt failure and stops monitoring all DL beam/TRP(s), in response to determining that the RAR window timer is expired. Further, the UE (100) handles as per existing procedure of 38.321,5.1.

At step 1510, the UE (100) determines that the PDCCH is decoded successfully over any of the DL TRPs, stop timer ra-ResponseWindow, or keeps monitoring. At step 1512, the UE (100) determines whether the DL DCI 1_0 contains multi TRPIDs as well along with PDSCH scheduling information. At step 1514, the UE (100) monitors the scheduled Msg2 PDSCH over the TRPs only where the DL DCI is received and decoded successfully, in response to determining that the DL DCI 1_0 does not contain multi TRPIDs as well along with PDSCH scheduling information. At step 1516, the UE (100) processes successfully the received PDSCH (and stop monitoring all other DL TRPs) as per 38.321,5.1.4. Further, at step 1518, the UE (100) monitors the scheduled Msg2 PDSCH over the indicated DL beam/TRP(s) only, in response to determining that the DL DCI 1_0 contains multi TRPIDs as well along with PDSCH scheduling information.

Figure 16:
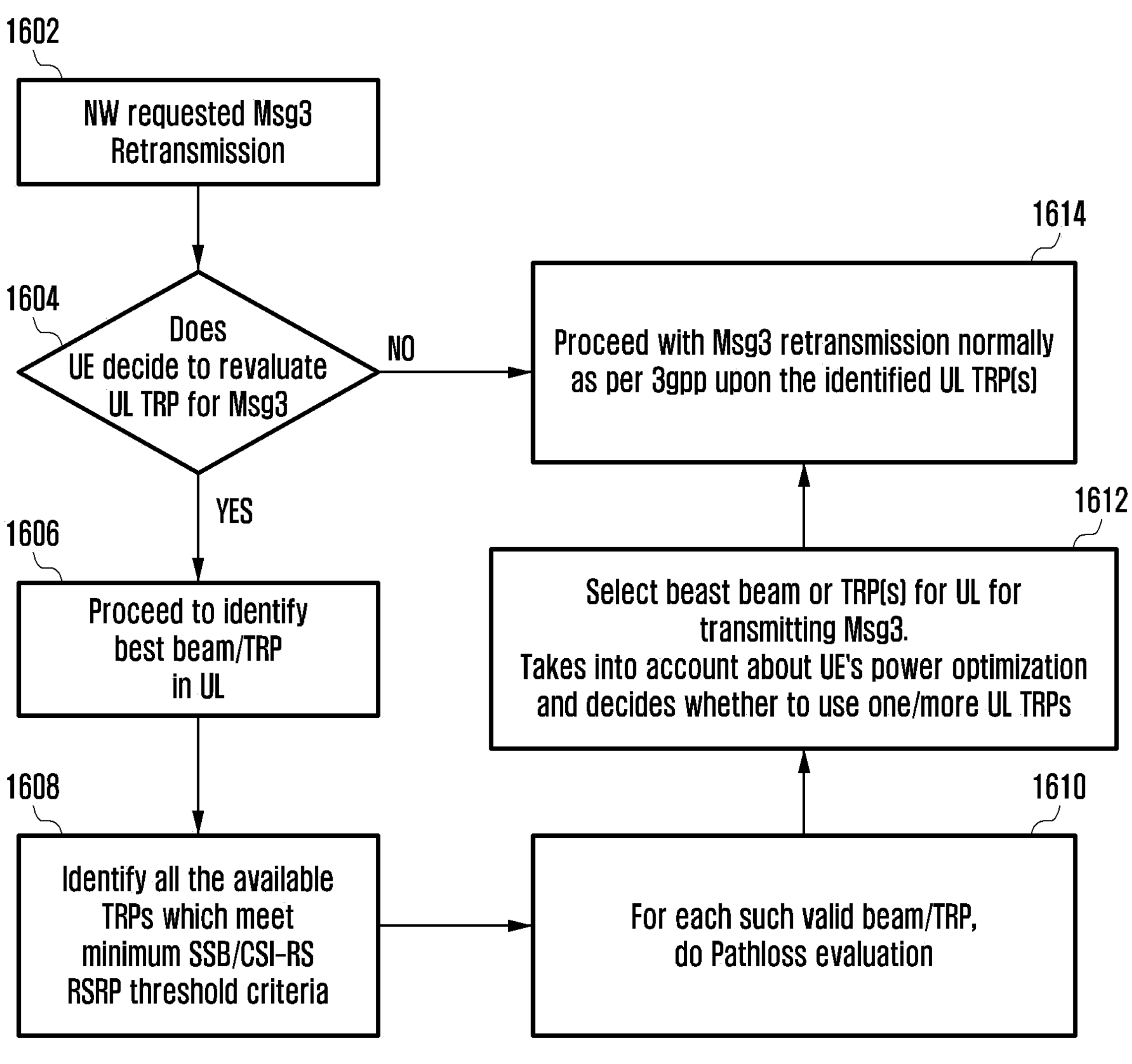
FIG. 16 is a flowchart illustrating a scenario of the UL TRPs for Msg3 transmission and a re-transmission of the Msg3, according to an embodiment as disclosed herein.

FIG. 16 is a flowchart (1600) illustrating a scenario of the UL TRPs for the Msg3 transmission and the re-transmission of the Msg3, according to an embodiment as disclosed herein.

In furtherance to the procedure explained with respect to the FIG. 15, after the successful reception and decoding of the RAR PDSCH or the Msg2 at the UE (100), the UE (100) applies the received RAR content, followed by preparation and transmission of the CCCH SDU or the Msg3 in the received UL grant, as described in the 3GPP specification with respect to the NR mmW RACH procedure. Further, the UE (100) is required to decide which of the UL TRPs needs to be used for the Msg3 transmission based on power optimization aspects of the UE (100) on the basis of battery remaining, overheating etc. Also, in another scenario if the node (200) sends the HARQ NACK for the Msg3 then the UE (100) needs to determine the UL TRPs to be used to retransmit the Msg3.

In the proposed method, for the transmission of the Msg3 in the UL, the UE (100) uses the same beam or the TRP which is either 'configured' or 'identified' as the best beam or the best TRP in the UL in the multi TRP serving system for the initial RACH Msg1 transmission. Further, based on consideration of various the power consumption aspects such as for example but not limited to battery remaining, overheating, etc., of the UE (100), the UE (100) decides whether to send the RACH Msg3 on only one or more than one best beam or the best TRP(s) in the UL.

In the proposed method, for the retransmission of the Msg3 when the node (200) sends the HARQ NACK due to channel/CRC decoding fails), the UE (100) chooses to re-evaluate the UL beam or the TRP ID to be used for Msg3 retransmission as it is done for the identification of the best beam or the best TRP for the RACH Msg1 based on the priority of the TRP, validity time (if any configured by the node (200)), pathloss evaluation etc.

Referring to the FIG. 16, at step 1602, the network requested Msg3 Retransmission is initiated by the UE (100). At step 1604, the UE (100) determines whether to revaluate the UL TRP for the Msg3. At step 1606, UE (100) proceeds to identify the best beam or the TRP in the UL, in response to determining to revaluate the UL TRP for the Msg3. At step 1608, the UE (100) identifies all the available TRPs which meet the minimum SSB/CSI-RS RSRP threshold criteria. Further, at step 1610, the UE (100) performs the pathloss evaluation for each of the valid beam/TRP. At step 1612, the UE (100) selects the best beam or the TRP(s) for the UL for retransmitting the Msg3. Further, the UE (100) also takes into account the power optimization of the UE (100) and decides whether to use one/more UL TRPs. At step 1614, the UE (100) proceeds with the Msg3 retransmission normally as per 3GPP specification upon the identified UL TRP(s), in response to determining not to revaluate the UL TRP for the Msg3.

FIG. 17 illustrates a scenario of making use of existing Reserved bits of NR DL DCI format 1_0 for RAR Msg4, according to an embodiment as disclosed herein. Referring to the FIG. 17, in the proposed method after the transmission of the Msg3 in the UL which is sent with the identifier as received in the RAR/Msg2 content i.e. Temp_C_RNTI, the UE (100) shall monitor the DL channel for the Msg4 within a Contention Resolution timer and follows the procedure as provided in existing NR mmW RACH procedure of the 3GPP. Further, as there are more than one TRPs serving the UE (100) in the DL in the multi-TRP system, various aspects needs to be considered for receiving the Msg4 in the DL which includes a) the UE (100) needs to decide which all beam/TRPs to monitor in the DL to receive the Msg4 and b) in case the NW decides to schedule multiple Msg4s in the DL over the multiple DL TRPs, then the DL scheduling mechanism and transmission of the Msg4 (PDCCH-PDSCH) in the multi TRP serving scenario is required.

In an embodiment, the above mentioned scenarios are addressed by identifying the DL TRP(s) to monitor the reception of the Msg4. Here, the UE (100) shall monitor all the beams or the TRPs that meet the best beam identification criteria as illustrated with respect to the evaluation of the Msg1 transmission or the re-evaluation of the Msg3 HARQ retransmission. Further, the network is identified the serving DL TRPs as part of the Msg2 DL TRPs identification process.

In another embodiment, the above mentioned scenarios are addressed by PDCCH-PDSCH scheduling of the Msg4. Here, the node (200) is flexible to schedule the Msg4 PDCCH and the PDSCH on at least one DL serving TRP. This is done in a similar manner as the RAR Msg2 scheduling scenario is handled. In order to perform the PDCCH-PDSCH scheduling of the Msg4, the node (200) schedules only one Msg4 on only one serving DL TRP (as performed in the existing 3GPP format) or the node (200) schedules more than one Msg4 on multiple serving DL TRPs. Therefore, scheduling more than one Msg4 on multiple serving DL TRPs helps in increasing the reliability of the Msg4 success. However, in such a scenario the node (200) further needs to decide whether to schedule more than one RAR Msg4 via only one PDCCH/DCI or via multiple PDCCH/DCI (multiple PDCCH-PDSCH pair) over the multiple serving TRPs. To schedule the multiple Msg4 over the multiple serving DL TRPs via one PDCCH/DCI, the scheduling format of the DL DCI is required to be redefined.

Therefore, the proposed method includes making use of the existing reserved bits of the NR DL DCI format 1_0 for scheduling the RAR Msg4 on the sixth TRP by using Reserved bits in the scheduling format of the DL DCI used by the node (200), to indicate multiple TRP scheduling in the DL and a bitmap is added at an end portion of the scheduling format of the DL DCI to provide the identities of the sixth TRP.

Here, a leftmost bit is used as an indicator of the presence of multiple TRPs scheduled in the DL, where bit value=1 indicates presence of multiple DL scheduled TRPs as "yes". Furthermore, when this bit is set to 1, the UE (100) shall read the TRP bitmap present at the end of the Reserved field. The new bitmap is used to indicate the beam/TRP IDs of the DL serving the TRPs over which the network wants to schedule the DL PDSCH Msg4. For example, once the UE (100) receives such a DL DCI message, the UE (100) should monitor the DL beam/TRP IDs 2, 6 & 7 (referring to FIG. 11 and assuming the network scheduled Msg4 on these 3 TRPs).

Figure 18:
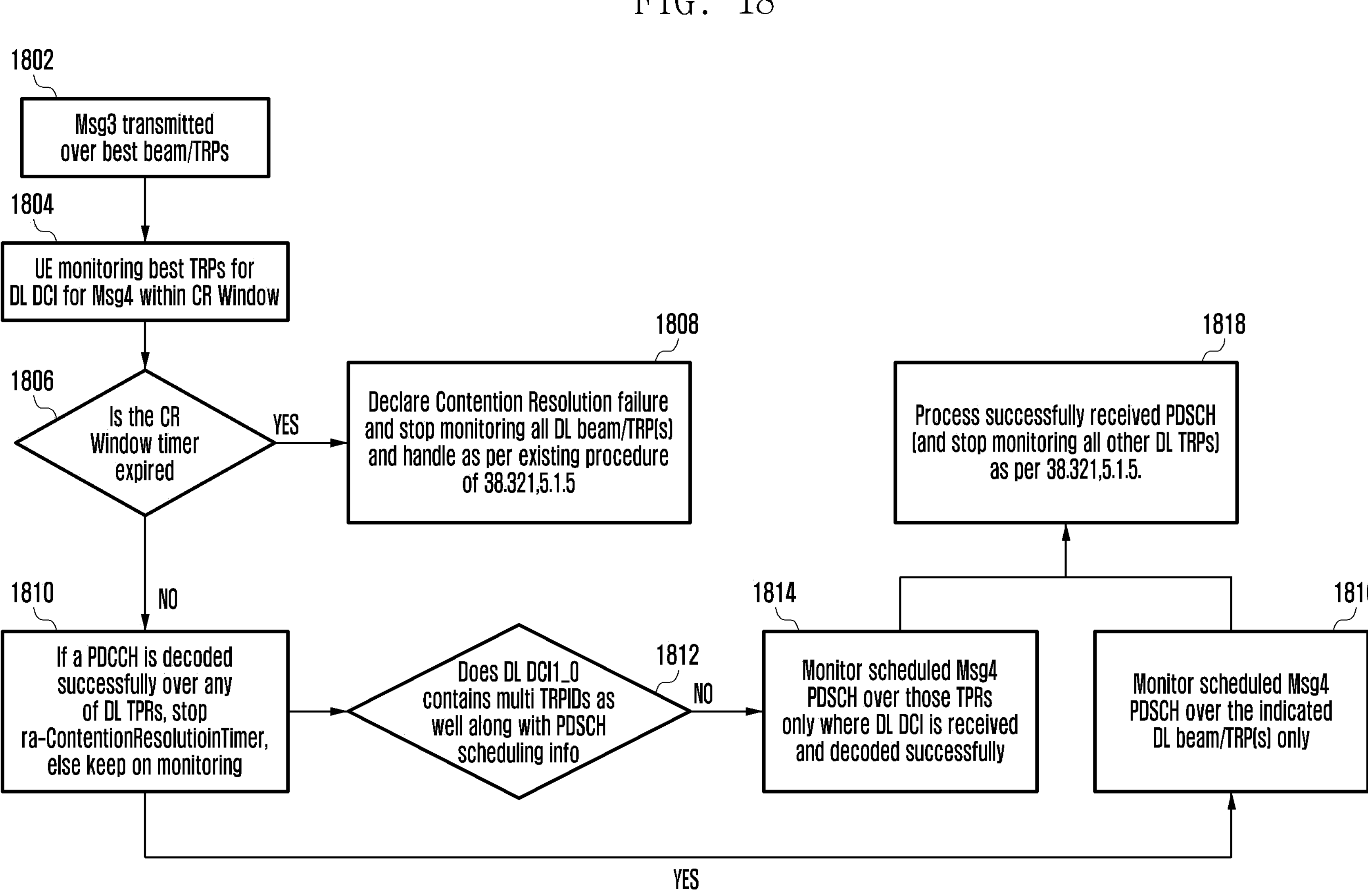
FIG. 18 is a flowchart illustrating a plurality of actions associated with the Msg3 and the Msg4 transmission between the UE and the node of the communication network, according to an embodiment as disclosed herein.

FIG. 18 is a flowchart (1800) illustrating a plurality of actions associated with Msg3 and Msg4 transmission between the UE (100) and the node (200) of the wireless network, according to an embodiment as disclosed herein. The plurality of actions include Msg3 transmission, DL monitoring for Msg4 scheduling within CR window, DL DCI decoding with information about Msg4 PDSCH being scheduled on same or one/more DL TRPs and possible Contention Resolution failure scenario handling.

At step 1802, the Msg3 is transmitted over the determined best beam or the TRP of the plurality of TRPs by the UE (100) to the node (200). At step 1804, the UE (100) monitors the best TRPs for the DL DCI for the Msg4 within CR window. At step 1806, the UE (100) determines if the CR window timer is expired or not. At step 1808, the UE (100) in response to determining that the CR window timer is expired, the UE (100) declares the Contention Resolution failure and stops monitoring all the DL beam/TRP(s) and handles as per existing procedure of provided in the standard specification no. 38.321,5.1.5.

At step 1810, the UE (100) in response to determining that the CR window timer is not expired, the UE (100) determines if a PDCCH is decoded successfully over any of the DL TRPs. If the PDCCH is decoded successfully then the UE (100) stops the ra-ContentionResolutionTimer and if the PDCCH is not decoded successfully then the UE (100) keeps on monitoring.

At step 1812, the UE (100) determines if the DL DCI 1_0 contains multi TRP IDs along with the PDSCH scheduling information. At step 1814, in response to determining that the DL DCI 1_0 does not contain the multi TRP IDs along with the PDSCH scheduling information, then the UE (100) monitors the scheduled Msg4 PDSCH over those TRPs only where the DL DCI is received and decoded successfully. At step 1816, in response to determining that the DL DCI 1_0 contains the multi TRP IDs along with the PDSCH scheduling information, then the UE (100) monitors the scheduled Msg4 PDSCH over the indicated DL beam/TRP(s) only. At step 1818, the UE (100) processes the successfully received PDSCH (and stop monitoring all other DL TRPs) as per standard specification no. 38.321,5.1.5.

According to an embodiment, a method for managing multiple Transmission Reception Points (TRPs) during random access channel (RACH) procedure within a multi-TRP system in a communication network may be provided.

According to an embodiment, the method may include detection, by at least one UE (100) of a plurality of UEs, presence of the multi-TRP system serving in at least one of downlink (DL) and uplink (UL).

According to an embodiment, the method may include determining, by the at least one UE (100), at least one first TRP of a plurality of TRPs serving in at least one of the DL and the UL, for transmission of a Random Access Preamble.

According to an embodiment, the method may include determining, by the at least one UE (100), at least one second TRP of the plurality of TRPs for monitoring reception of a Random Access Response (RAR).

According to an embodiment, the method may include receive, by the at least one UE (100), the RAR on at least one third TRP.

According to an embodiment, the at least one third TRP may be determined by a node (200) of the communication network.

According to an embodiment, the method may include determining, by the at least one UE (100), at least one fourth TRP of the plurality of TRPs for scheduling physical uplink shared channel (PUSCH) transmission by a UL grant of the RAR.

According to an embodiment, the method may include determining, by the at least one UE (100), at least one fifth TRP of the plurality of TRPs for monitoring reception of a contention resolution message.

According to an embodiment, the method may include receiving, by the at least one UE (100), the contention resolution message on at least one sixth TRP.

According to an embodiment, the at least one sixth TRP may be determined by the node (200) of the communication network.

According to an embodiment, receiving, by the at least one UE (100), the RAR on the at least one third TRP may include: determining, by the node (200), the at least one third TRP of the plurality of TRPs for scheduling the transmission of the RAR; scheduling, by the node (200), the transmission of the RAR on the determined at least one third TRP; sending, by the node (200), the RAR on the determined at least one third TRP based on the scheduling; and receiving, by the at least one UE (100), the RAR on at least one third TRP.

According to an embodiment, the plurality of TRPs may be detected by the at least one UE (100), using at least one of existing system information (SI), a new SI, a layer3 (L3) signalling broadcast message, a layer 1 (L1) message or a layer 2 (L2) message.

According to an embodiment, determining, by the at least one UE (100), the at least one first TRP of the plurality of TRPs serving in at least one of the DL and the UL, for the transmission of the Random Access Preamble may include: determining, by the at least one UE (100), a power consumption aspect associated with the at least one UE (100); determining, by the at least one UE (100), the transmission of the Random Access Preamble on the at least one first TRP of the plurality of TRPs based on the power consumption aspect associated with the at least one UE (100); and determining, by the at least one UE (100), the at least one first TRP of the plurality of TRPs serving in at least one of the DL and the UL, for the transmission of the Random Access Preamble by one of: the node (200) configuring a set of identities (ID) associated with the at least one first TRP of the plurality of TRPs to be used for sending the Random Access Preamble by the at least one UE (100), and/or the at least one UE (100) selecting the at least one first TRP of the plurality of TRPs based on a threshold criteria.

According to an embodiment, the threshold criteria may be one of: a minimum Synchronization Signal Block (SSB), a minimum Channel State Information Reference Signal (CSI-RS) reference signal received power (RSRP) threshold criteria and a path loss evaluation for each TRP of the plurality of TRPs.

According to an embodiment, the at least one second TRP for monitoring the reception of the RAR may be determined by the at least one UE (100) by: listening on each of the plurality of TRPs serving in the DL or monitoring the at least one first TRP of the plurality of TRPs.

According to an embodiment, determining, by the node (200), the at least one third TRP of the plurality of TRPs for scheduling the transmission of the RAR may include: determining, by the node (200), the multi-TRP system is a network centric cluster; determining, by the node (200), the at least one third TRP of the plurality of TRPs for scheduling the transmission of the RAR as one of: any TRP of the plurality of TRPs excluding the at least one first TRP, and more than one TRP of the plurality of TRPs that is serving the at least one UE (100) in the DL.

According to an embodiment, determining, by the node (200), the at least one third TRP of the plurality of TRPs for scheduling the transmission of the RAR may include: determining, by the node (200), the multi-TRP system is a UE centric cluster; and determining, by the node (200), the at least one third TRP of the plurality of TRPs by associating a relative beam position of the at least one third TRP with the at least one first TRP of the plurality of TRPs over which the Random Access Preamble is received by the node (200).

According to an embodiment, scheduling, by the node (200), the transmission of the RAR on the determined at least one third TRP may include one of: scheduling, by the node (200), a single RAR Msg2 on a third TRP of the plurality of TRPs, wherein the third TRP is only one serving DL TRP; and scheduling, by the node (200), a plurality of RAR Msg2 on the at least one third TRP, wherein the at least one third TRPs are multiple serving DL TRPs.

According to an embodiment, the plurality of RAR Msg2 on the at least one third TRP may be scheduled via one of: a single Physical Downlink Control Channel (PDCCH) or Downlink control information (DCI); and multiple PDCCH or DCI over the plurality of TRPs.

According to an embodiment, the plurality of RAR Msg2 may be scheduled on the at least one third TRP by using Reserved bits in a scheduling format of a DL DCI used by the node (200) to schedule the RAR Msg2, to indicate multiple TRP scheduling in the DL and wherein a bitmap is added at an end portion of the scheduling format of the DL DCI to provide identities of the at least one third TRP.

According to an embodiment, the at least one fourth TRP may be same as the at least one first TRP of the plurality of TRPs used for the transmission of the Random Access Preamble.

According to an embodiment, the method may include receiving, by the at least one UE (100), a Hybrid Automatic Repeat Request (HARQ) negative acknowledgment (NACK) from the node (200), due to channel or cyclic redundancy check (CRC) decoding failure.

According to an embodiment, the method may include determining, by the at least one UE (100), at least one next fourth TRP of the plurality of TRPs for scheduling the PUSCH transmission by the UL grant of the RAR, based on at least one of a priority associated with the plurality of TRPs, a validity time and a pathloss evaluation.

According to an embodiment, the at least one fifth TRP of the plurality of TRPs for monitoring the reception of the contention resolution message may be the at least one first TRP and at least one next fourth TRP.

According to an embodiment, receiving, by the at least one UE (100), the contention resolution message on the at least one sixth TRP may include: determining, by the node (200), the at least one sixth TRP of the plurality of TRPs for scheduling the transmission of the contention resolution message; scheduling, by the node (200), the transmission of the contention resolution message on the determined at least one sixth TRP; sending, by the node (200), the contention resolution message on the at least one sixth TRP based on the scheduling; and receiving, by the at least one UE (100), the contention resolution message on the at least one sixth TRP.

According to an embodiment, scheduling, by the node (200), the transmission of the contention resolution message on the at least one sixth TRP may include one of: scheduling, by the node (200), a single RAR Msg4 on a sixth TRP of the plurality of TRPs, wherein the third TRP is only one serving DL TRP, and scheduling, by the node (200), a plurality of RAR Msg4 on the at least one sixth TRP, wherein the at least one sixth TRPs are multiple serving DL TRPs.

According to an embodiment, the plurality of RAR Msg4 on the at least one sixth TRP may be scheduled via one of: a single PDCCH or DCI; and multiple PDCCH or DCI over the plurality of TRPs.

According to an embodiment, the plurality of RAR Msg4 may be scheduled on the at least one sixth TRP by using Reserved bits in a scheduling format of a DL DCI used by the node (200) to schedule the RAR Msg4, to indicate multiple TRP scheduling in the DL and wherein a bitmap is added at an end portion of the scheduling format of the DL DCI to provide identities of the at least one sixth TRP.

According to an embodiment, the method may include processing, by the at least one UE (100), a received Physical downlink shared channel (PDSCH).

According to an embodiment, the method may include stopping, by the at least one UE (100), the monitoring of the plurality of TRPs.

According to an embodiment, the method may include stopping, by the at least one UE (100), the monitoring of the at least one second TRP and the least one fifth TRP for power optimization at the at least one UE (100).

According to an embodiment, the method may include monitoring, by the at least one UE (100), only the at least one first TRP used for the transmission of the Random Access Preamble.

According to an embodiment, a user equipment (UE) (100) for managing multiple TRPs during RACH procedure within a multi-TRP system in a communication network may be provided.

According to an embodiment, the UE (100) may include a memory (120); a processor (140) coupled to the memory (120), a communicator (160) coupled to the memory (120), the processor (140), and a TRP management controller (180) coupled to the memory (120), the processor (140) and the communicator (160).

According to an embodiment, the TRP management controller (180) may be configured to detect presence of the multi-TRP system serving in at least one of downlink and uplink.

According to an embodiment, the TRP management controller (180) may be configured to determine at least one first TRP of the plurality of TRPs serving in at least one of the downlink and the uplink, for transmission of a Random Access Preamble.

According to an embodiment, the TRP management controller (180) may be configured to determine at least one second TRP of the plurality of TRPs for monitoring a reception of a Random Access Response (RAR).

According to an embodiment, the TRP management controller (180) may be configured to receive the RAR on at least one third TRP.

According to an embodiment, the at least one third TRP may be determined by a node (200) of the communication network.

According to an embodiment, the TRP management controller (180) may be configured to determine at least one fourth TRP of the plurality of TRPs for scheduling PUSCH transmission by a UL grant of the RAR.

According to an embodiment, the TRP management controller (180) may be configured to determine at least one fifth TRP of the plurality of TRPs for monitoring a reception of a contention resolution message.

According to an embodiment, the TRP management controller (180) may be configured to receive the contention resolution message on at least one sixth TRP, According to an embodiment, the at least one sixth TRP may be determined by the node (200) of the communication network.

According to an embodiment, a node (200) for managing multiple TRPs during RACH procedure within a multi-TRP system in a communication network may be provided.

According to an embodiment, the node (200) may include a memory (220); a processor (240) coupled to the memory (220); a communicator (260) coupled to the memory (220) and the processor (240); and a node TRP management controller (280) coupled to the memory (220), the processor (240) and the communicator (260).

According to an embodiment, the node TRP management controller (280) may be configured to determine at least one third TRP of a plurality of TRPs for scheduling a transmission of a RAR.

According to an embodiment, the node TRP management controller (280) may be configured to schedule the transmission of the RAR on the determined at least one third TRP.

According to an embodiment, the node TRP management controller (280) may be configured to determine at least one sixth TRP of the plurality of TRPs for scheduling a transmission of a contention resolution message.

According to an embodiment, the node TRP management controller (280) may be configured to schedule the transmission of the contention resolution message on the determined at least one sixth TRP.

Figure 19:
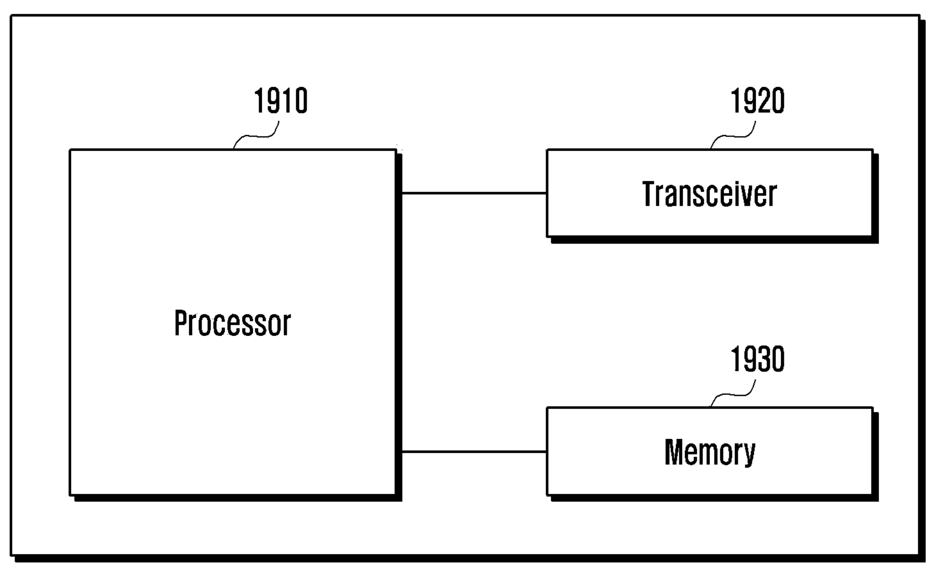
FIG. 19 illustrates an electronic device according to embodiments of the disclosure.

FIG. 19 illustrates an electronic device according to embodiments of the disclosure.

Referring to the FIG. 19, the electronic device 1900 may include a processor 1910, a transceiver 1920 and a memory 1930. However, all of the illustrated components are not essential. The electronic device 1900 may be implemented by more or less components than those illustrated in FIG. 19. In addition, the processor 1910 and the transceiver 1920 and the memory 1930 may be implemented as a single chip according to another embodiment.

The electronic device 1900 may correspond to the UE described above.

The aforementioned components will now be described in detail.

The processor 1910 may include one or more processors or other processing devices that control the proposed function, process, and/or method. Operation of the electronic device 1900 may be implemented by the processor 1910.

The transceiver 1920 may include a RF transmitter for up-converting and amplifying a transmitted signal, and a RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the electronic device 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

Figure 20:
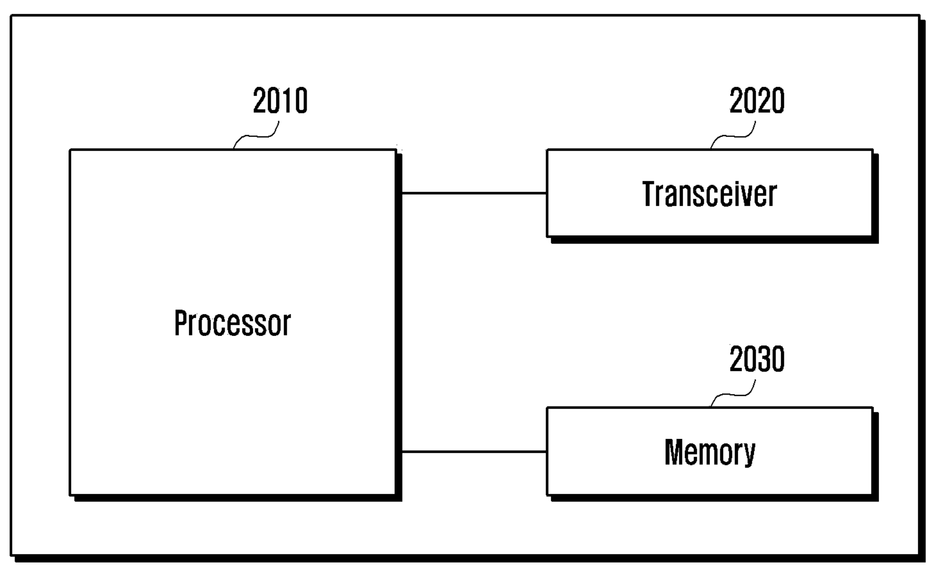
FIG. 20 illustrates an electronic device according to embodiments of the disclosure.

FIG. 20 illustrates an electronic device according to embodiments of the disclosure.

Referring to the FIG. 20, the electronic device 2000 may include a processor 2010, a transceiver 2020 and a memory 2030. However, all of the illustrated components are not essential. The electronic device 2000 may be implemented by more or less components than those illustrated in FIG. 20. In addition, the processor 2010 and the transceiver 2020 and the memory 2030 may be implemented as a single chip according to another embodiment.

The electronic device 2000 may correspond to the base station, gNB or the node described above.

The aforementioned components will now be described in detail.

The processor 2010 may include one or more processors or other processing devices that control the proposed function, process, and/or method. Operation of the electronic device 2000 may be implemented by the processor 2010.

The transceiver 2020 may include a RF transmitter for up-converting and amplifying a transmitted signal, and a RF receiver for down-converting a frequency of a received signal. However, according to another embodiment, the transceiver 2020 may be implemented by more or less components than those illustrated in components.

The transceiver 2020 may be connected to the processor 2010 and transmit and/or receive a signal. The signal may include control information and data. In addition, the transceiver 2020 may receive the signal through a wireless channel and output the signal to the processor 2010. The transceiver 2020 may transmit a signal output from the processor 2010 through the wireless channel.

The memory 2030 may store the control information or the data included in a signal obtained by the electronic device 2000. The memory 2030 may be connected to the processor 2010 and store at least one instruction or a protocol or a parameter for the proposed function, process, and/or method. The memory 2030 may include read-only memory (ROM) and/or random access memory (RAM) and/or hard disk and/or CD-ROM and/or DVD and/or other storage devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) in a communication system, the method comprising:

identifying presence of multiple transmission and reception points (TRPs) (multi-TRP) system serving in at least one of downlink (DL) and uplink (UL);

identifying at least one first TRP of a plurality of TRPs serving in at least one of the DL and the UL, for transmission of a random access preamble;

identifying at least one second TRP of the plurality of TRPs for monitoring reception of a random access response (RAR);

receiving the RAR from at least one third TRP;

identifying at least one fourth TRP of the plurality of TRPs for scheduling physical uplink shared channel (PUSCH) transmission by a UL grant of the RAR;

identifying at least one fifth TRP of the plurality of TRPs for monitoring reception of a contention resolution message; and receiving the contention resolution message from at least one sixth TRP.

2. The method of claim 1, wherein scheduling information for the RAR is received on the at least one third TRP, and wherein scheduling information for the contention resolution message is received on the at least one sixth TRP.

3. The method of claim 1, wherein the plurality of TRPs is identified by the UE, using at least one of existing system information (SI), a new SI, a layer3 (L3) signalling broadcast message, a layer 1 (L1) message or a layer 2 (L2) message.

4. The method of claim 1, wherein identifying the at least one first TRP comprises:

identifying a power consumption aspect associated with the UE;

identifying the transmission of the random access preamble on the at least one first TRP of the plurality of TRPs based on the power consumption aspect associated with the UE; and identifying the at least one first TRP of the plurality of TRPs serving in at least one of the DL and the UL, for the transmission of the random access preamble by at least one of:

a set of at least one identity (ID) associated with the at least one first TRP of the plurality of TRPs to be used for the transmission of the random access preamble by the at least one UE (100), wherein the set of at least one ID is configured from a node in a communication system, or selecting the at least one first TRP of the plurality of TRPs by the UE based on a threshold criterion, wherein the threshold criterion is one of: a minimum reference signal received power (RSRP) threshold criteria or a path loss evaluation for each TRP of the plurality of TRPs, and wherein a reference signal for the RSRP threshold criteria is at least one of a synchronization signal block (SSB) or a channel state information reference signal (CSI-RS).

5. The method of claim 1, wherein the at least one second TRP for monitoring the reception of the RAR is identified by the UE by: listening on each of the plurality of TRPs serving in the DL or monitoring the at least one first TRP of the plurality of TRPs.

6. The method of claim 1, wherein the at least one fourth TRP is same as the at least one first TRP of the plurality of TRPs used for the transmission of the random access preamble, and wherein the at least one fifth TRP of the plurality of TRPs for monitoring the reception of the contention resolution message is the at least one first TRP and at least one next fourth TRP.

7. The method of claim 1, further comprising:

receiving a hybrid automatic repeat request (HARQ) negative acknowledgment (NACK) due to channel or cyclic redundancy check (CRC) decoding failure; and identifying at least one next fourth TRP of the plurality of TRPs for scheduling the PUSCH transmission by the UL grant of the RAR, based on at least one of a priority associated with the plurality of TRPs, a validity time and a pathloss evaluation.

8. The method of claim 1, further comprising:

processing a received physical downlink shared channel (PDSCH); and stopping monitoring of the plurality of TRPs.

9. The method of claim 1, further comprising:

stopping the monitoring of the at least one second TRP and the least one fifth TRP for power optimization at the UE; and monitoring only the at least one first TRP used for the transmission of the random access preamble.

10. A user equipment (UE) in a communication system, the UE comprising:

a transceiver; and a processor coupled with transceiver and configured to:

identify presence of multiple transmission and reception points (TRPs) (multi-TRP) system serving in at least one of downlink (DL) and uplink (UL);

identify at least one first TRP of a plurality of TRPs serving in at least one of the DL and the UL, for transmission of a random access preamble;

identify at least one second TRP of the plurality of TRPs for monitoring reception of a random access response (RAR);

receive the RAR from at least one third TRP;

identify at least one fourth TRP of the plurality of TRPs for scheduling physical uplink shared channel (PUSCH) transmission by a UL grant of the RAR;

identify at least one fifth TRP of the plurality of TRPs for monitoring reception of a contention resolution message; and receive the contention resolution message from at least one sixth TRP.

11. A method performed by a node in a communication system, the method comprising:

identifying at least one third transmission and reception point (TRP) of a plurality of TRPs for scheduling transmission of a random access response (RAR), wherein the plurality of TRPs are associated with multiple transmission and reception points (TRPs) (multi-TRP) system;

scheduling the transmission of the RAR on the identified at least one third TRP;

identifying at least one sixth TRP of the plurality of TRPs for scheduling a transmission of a contention resolution message; and scheduling the transmission of the contention resolution message on the identified at least one sixth TRP.

12. The method of claim 11, wherein identifying the at least one third TRP comprises:

identifying whether the multi-TRP system is a network centric cluster or a user equipment (UE) centric cluster;

in case that the multi-TRP system is the network centric cluster, identifying the at least one third TRP of the plurality of TRPs for scheduling the transmission of the RAR as one of:

any TRP of the plurality of TRPs excluding at least one first TRP for a random access preamble, and more than one TRP of the plurality of TRPs that is serving at least one UE in downlink; and in case that the multi-TRP system is the UE centric cluster, identifying the at least one third TRP of the plurality of TRPs by associating a relative beam position of the at least one third TRP with the at least one first TRP of the plurality of TRPs over which the random access preamble is received by the node.

13. The method of claim 11, wherein scheduling the transmission of the RAR comprises one of:

scheduling a single RAR message 2 (Msg2) on a third TRP of the plurality of TRPs, wherein the third TRP is only one serving DL TRP; and scheduling a plurality of RAR Msg2 on the at least one third TRP, wherein the at least one third TRPs are multiple serving DL TRPs, wherein the plurality of RAR Msg2 on the at least one third TRP is scheduled via one of: a single physical downlink control channel (PDCCH) or downlink control information (DCI); multiple PDCCH or DCI over the plurality of TRPs; or using reserved bits in a scheduling format of a DL DCI used by the node to schedule the RAR Msg2, to indicate multiple TRP scheduling in the DL and wherein a bitmap is added at an end portion of the scheduling format of the DL DCI to provide identities of the at least one third TRP.

14. The method of claim 11, wherein scheduling the transmission of the contention resolution message comprises one of:

scheduling a single RAR message 4 (Msg4) on a sixth TRP of the plurality of TRPs, wherein the third TRP is only one serving DL TRP, and scheduling, a plurality of RAR Msg4 on the at least one sixth TRP, wherein the at least one sixth TRPs are multiple serving DL TRPs, wherein the plurality of RAR Msg4 on the at least one sixth TRP is scheduled via one of: a single PDCCH or DCI; multiple PDCCH or DCI over the plurality of TRPs; or using reserved bits in a scheduling format of a DL DCI used by the node to schedule the RAR Msg4, to indicate multiple TRP scheduling in the DL and wherein a bitmap is added at an end portion of the scheduling format of the DL DCI to provide identities of the at least one sixth TRP.

15. A node in a communication system, the node comprising:

a transceiver; and a processor coupled with the processor and configured to:

identify at least one third transmission and reception point (TRP) of a plurality of TRPs for scheduling transmission of a random access response (RAR), wherein the plurality of TRPs are associated with multiple transmission and reception points (TRPs) (multi-TRP) system;

schedule the transmission of the RAR on the identified at least one third TRP;

identify at least one sixth TRP of the plurality of TRPs for scheduling a transmission of a contention resolution message; and schedule the transmission of the contention resolution message on the identified at least one sixth TRP.

* * * * *